United States Patent [19]
Elliott et al.

[11] Patent Number: 5,298,728
[45] Date of Patent: Mar. 29, 1994

[54] SIGNAL PROCESSING APPARATUS AND METHOD

[75] Inventors: Randy D. Elliott; Blaine F. Loris, both of Eugene, Oreg.

[73] Assignee: Spectra-Physics Scanning System, Inc., Eugene, Oreg.

[21] Appl. No.: 786,290

[22] Filed: Nov. 1, 1991

[51] Int. Cl.$^5$ .............................................. G06K 7/10
[52] U.S. Cl. ................................... 235/463; 250/568
[58] Field of Search ..................... 235/463, 462, 472; 250/568

[56] References Cited

U.S. PATENT DOCUMENTS

| | | |
|---|---|---|
| 3,225,213 | 12/1967 | Kinrichs et al. . |
| 3,502,993 | 3/1970 | Schurzinger et al. . |
| 3,751,636 | 8/1973 | Coles, Jr. . |
| 3,761,725 | 9/1973 | Meyer . |
| 3,804,979 | 4/1974 | Knowles . |
| 3,909,594 | 9/1975 | Allais et al. . |
| 3,991,299 | 11/1976 | Chadima, Jr. et al. . |
| 3,999,043 | 12/1976 | Reiss et al. . |
| 4,000,397 | 12/1976 | Herbert et al. . |
| 4,020,357 | 4/1977 | Punis . |
| 4,078,227 | 3/1978 | Fahey et al. . |
| 4,104,514 | 8/1978 | Sherer et al. . |
| 4,140,271 | 2/1979 | Nojiri et al. . |
| 4,162,408 | 7/1979 | Hansen . |
| 4,175,256 | 11/1979 | Dolikian . |
| 4,196,845 | 4/1980 | Chesters . |
| 4,354,101 | 10/1982 | Hester et al. ....................... 235/463 |
| 4,360,798 | 11/1982 | Swartz et al. . |
| 4,749,879 | 6/1988 | Peterson et al. ................... 235/462 |
| 5,103,080 | 4/1992 | Barkan . |
| 5,149,948 | 9/1992 | Chisholm .......................... 235/462 |

FOREIGN PATENT DOCUMENTS 90119615.4 6/1991 European Pat. Off. .

OTHER PUBLICATIONS

"A Low Cost Light Wand Amplifier," Robin C. Moseley, Byte Magazine, May 1978, vol. 3, No. 5.
"Dynamic Threshold Circuit," IBM Technical Disclosure Bulletin, vol. 15, No. 4, Sep. 1972, pp. 1138–1139.
"Signal Processing For Optical Bar Code Scanning," Merkowitz, Byte Magazine, Dec. 1976.
"Contrast Amplifier," IBM Technical Disclosure Bulletin, vol. 14, No. 3, pp. 883–884, Aug. 1971.

*Primary Examiner*—David C. Nelms
*Assistant Examiner*—K. Shami
*Attorney, Agent, or Firm*—Lyon & Lyon

[57] ABSTRACT

A signal processing apparatus and method adapted for use in bar code scanners is described. The apparatus forms a derivative signal, and utilizes the derivative signal to detect transition points from white to black bars and vice-versa. Then, the apparatus starts and stops the generation of digital pulses at or about the transition points, thereby generating pulses having widths corresponding to the widths of the bars making up the bar code symbol. The apparatus is capable of successively scanning a bar code symbol more than once, and varying various processing parameters used in forming the derivative signal over the successive scans, including threshold level, overall bandpass, overall amplification, and the like.

53 Claims, 19 Drawing Sheets

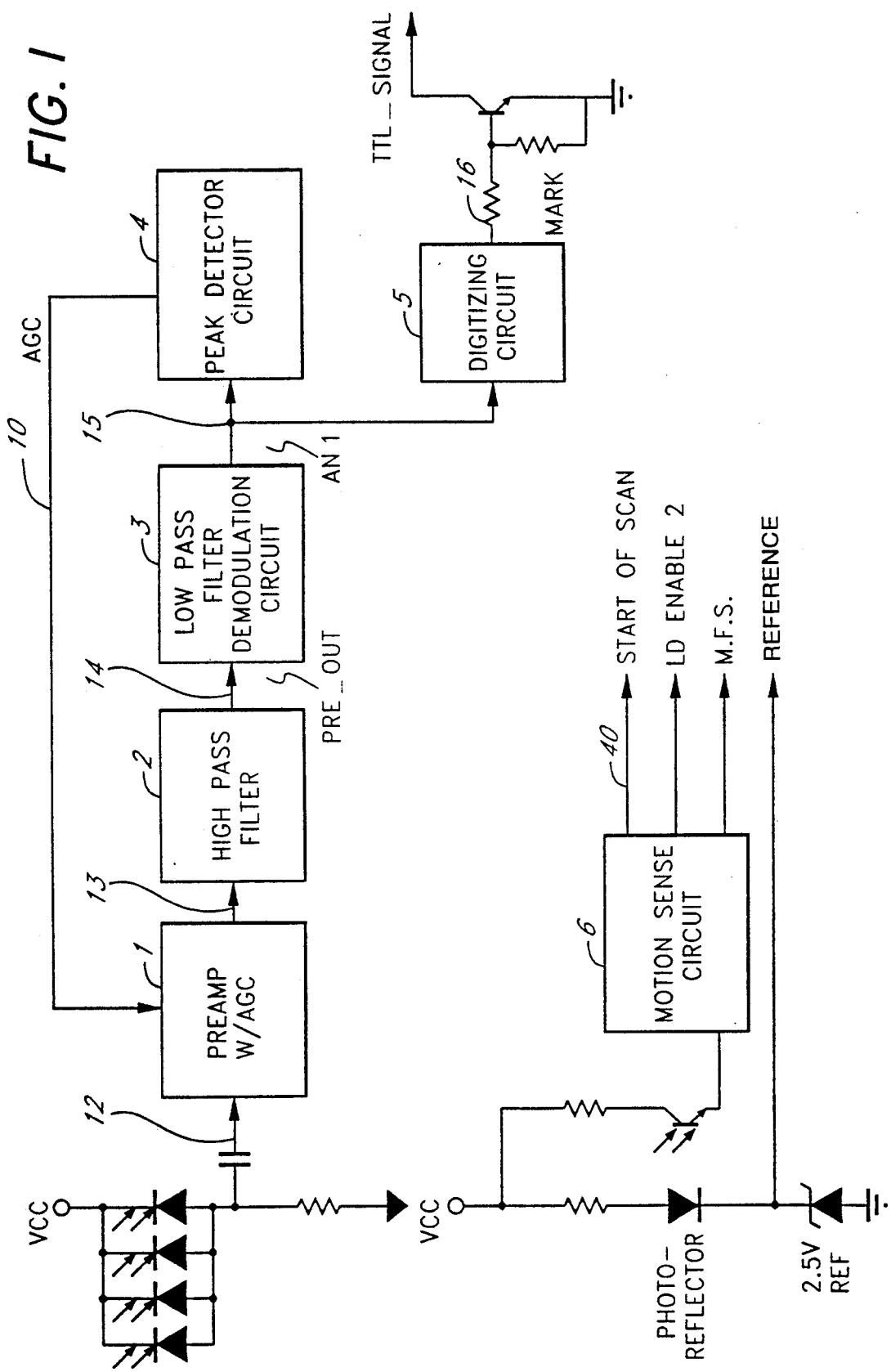

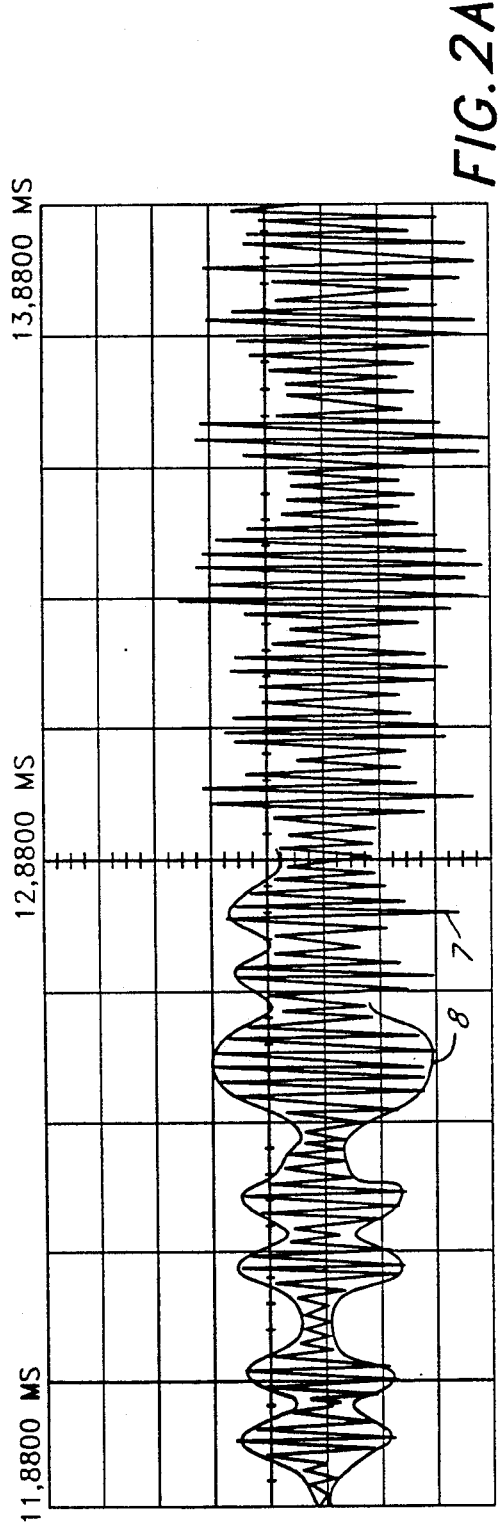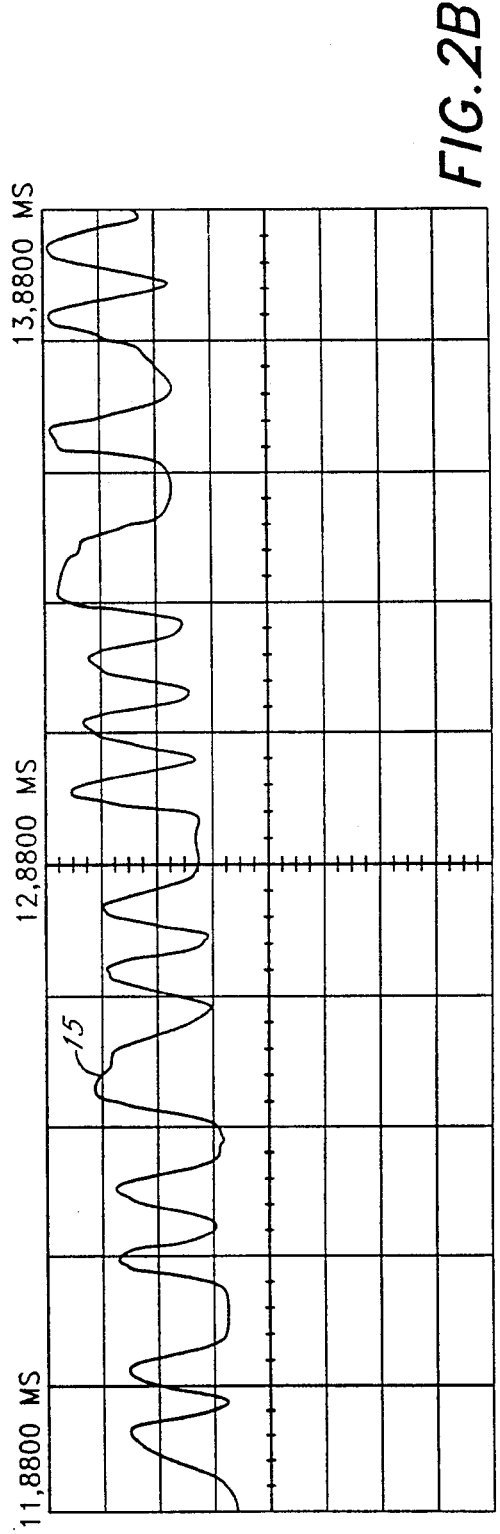

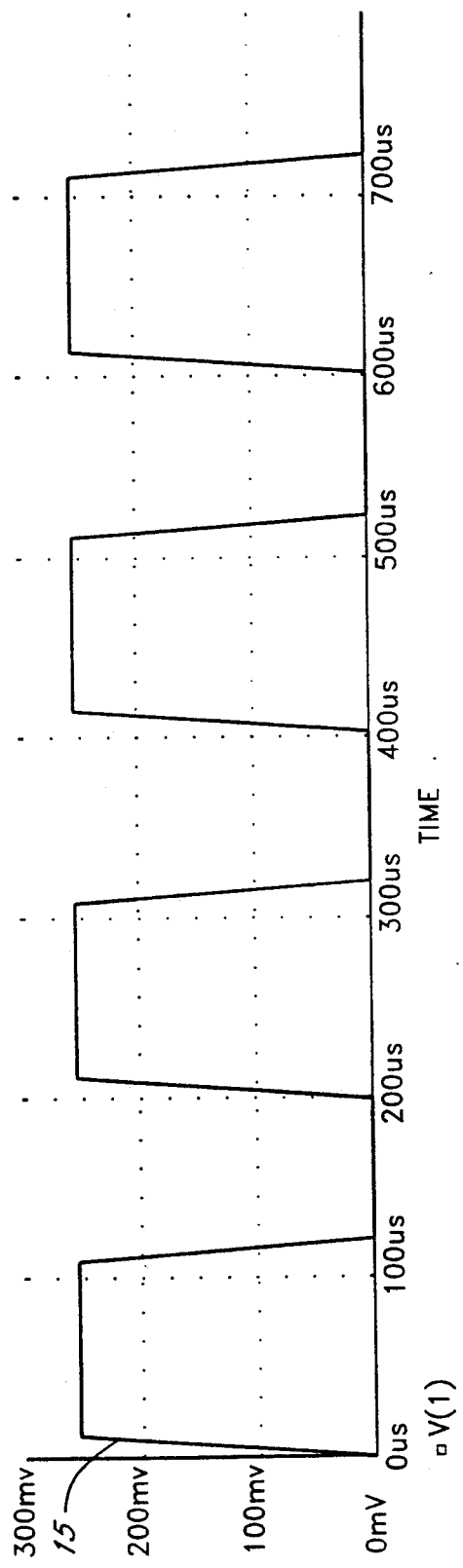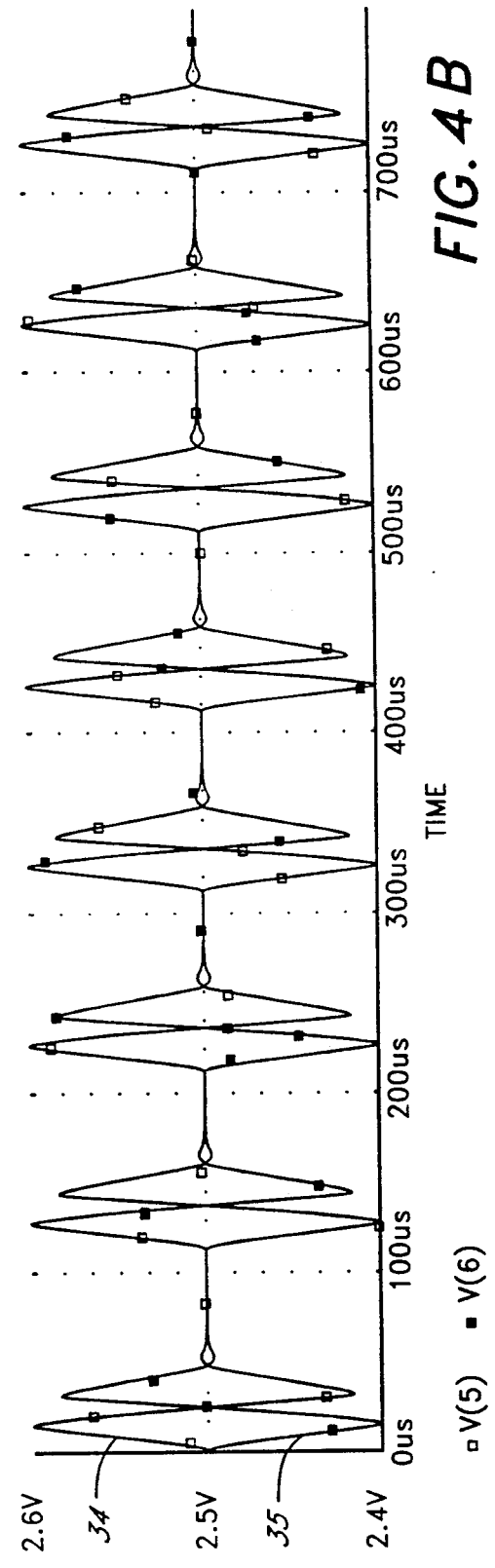

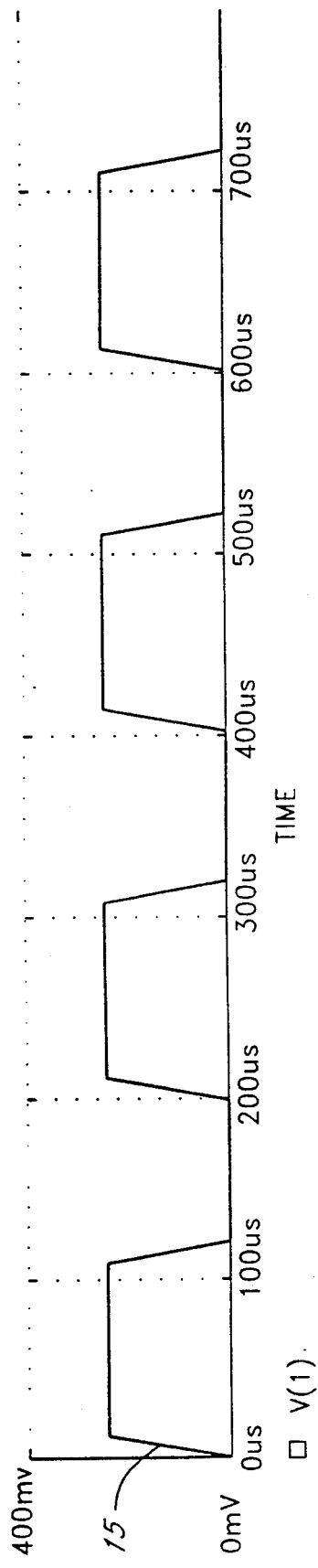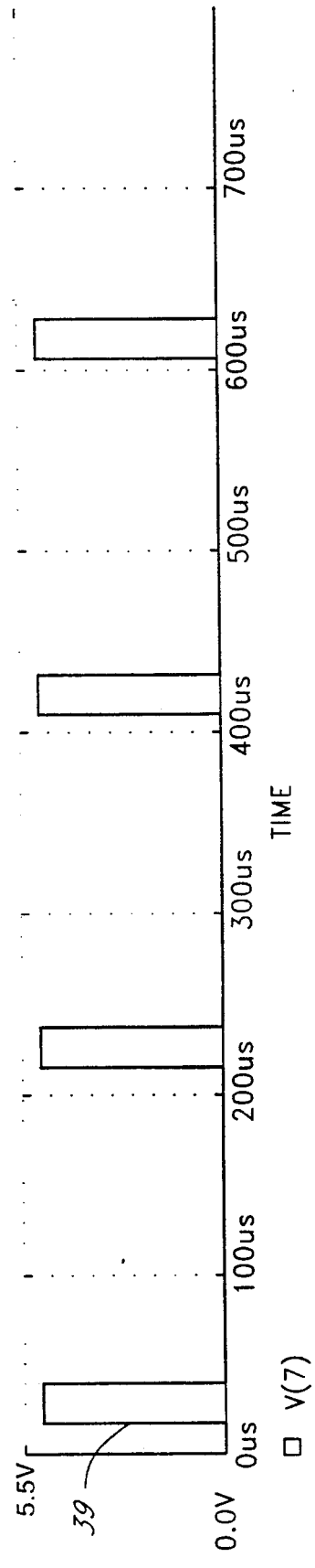

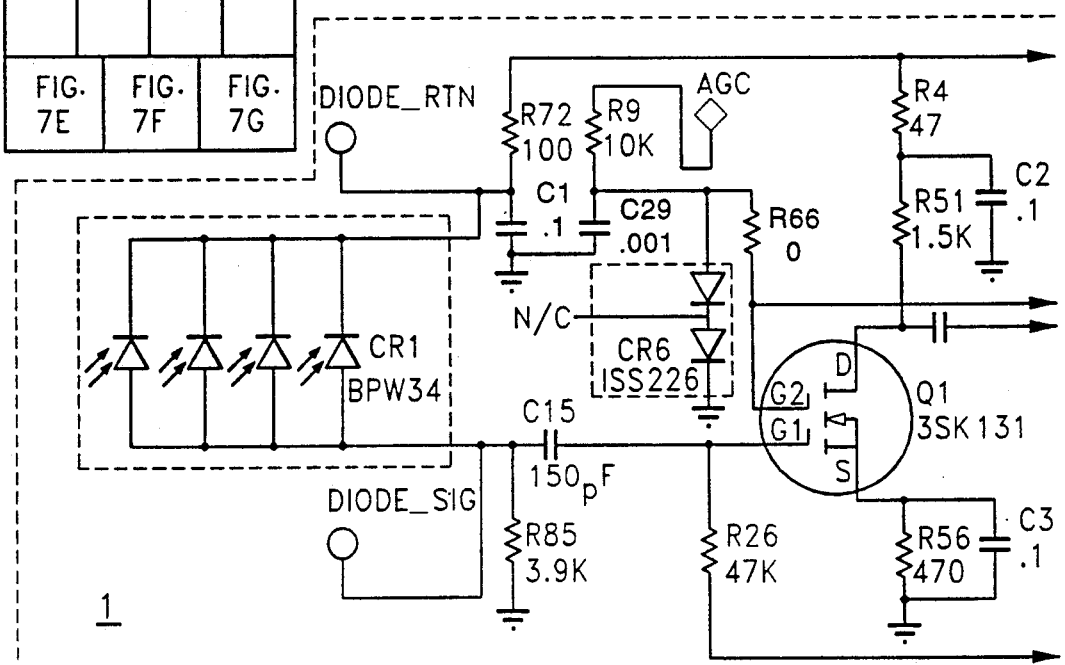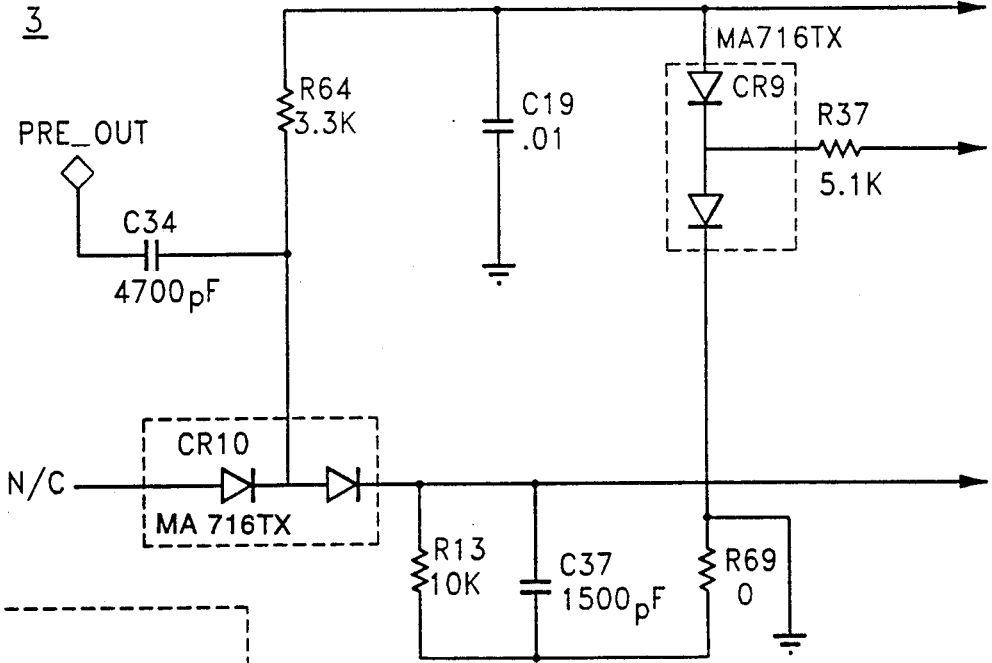
FIG. 7
FIG. 7A

SIGNAL PROCESSING APPARATUS AND METHOD

BACKGROUND OF THE INVENTION

1. Field of the Invention

The present invention relates to the field of signal processing circuitry for use in bar code scanners, and more particularly, to signal processing circuitry for bar code scanners which is configured to be capable of changing various processing parameters on successive scans of a bar code symbol in order to achieve a better read rate compared with conventional approaches.

2. Background

Bar code scanners can either be categorized as fixed scanners or hand-held scanners. A fixed scanner is characterized by the fact that its location is fixed, so that the article being scanned must be brought to the scanner, while a hand-held scanner is characterized by the fact that it is mobile, so that the scanner can be brought to the article being scanned.

A bar code scanner, whether hand-held or fixed, operates by scanning a spot of light across the alternating black and white bars of a bar code symbol, detecting the light reflected off the symbol to form an analog signal having a magnitude proportional to the intensity of the reflected light, digitizing the analog signal to form a digital signal, where the width of the pulses making up the digital signal corresponds to the width of the bars in the bar code symbol, and then decoding the digital signal to determine the information which the symbol represents. The process of digitizing the analog signal is known as signal processing.

Various methods for signal processing have been employed in bar code scanners in the past, although each has been fraught with one or more problems when so employed.

One such method which is the "delay and compare" method, described more fully in U.S. Pat. No. 4,360,798, which is hereby fully incorporated by reference herein as though set forth in full.

According to the "delay and compare" method, one or more threshold signals are produced by delaying the analog signal and then offsetting the peaks and valleys of the delayed signal by a fixed amount, i.e., typically by one or more diode voltage drops. The threshold signals are then compared with the analog signal, and a digital signal is produced by starting or stopping the generation of digital pulses at the points where the analog signal intersects the threshold signals.

A first problem with the "delay and compare" method is that it will not successfully digitize weak analog signals, i.e., those that do not swing wide enough to cross the threshold signals. Nor is it very successful in digitizing analog signals produced from a label having a low contrast ratio, or analog signals produced when the scanner is positioned far from the article being scanned.

A second problem with this method is that it will not successfully digitize the analog signal when the scanner is positioned at or near the dead angle, i.e., at or near the angle at which the scanner intercepts a maximum of the reflected light from the symbol. This is because in this circumstance, the light detection circuitry typically becomes saturated, causing the label contents of the analog signal to become greatly reduced. Consequently, the threshold signals, which are determined at least partly by the peaks and valleys of the analog signal, will be distorted, and the resulting digital signal will be likewise distorted.

A third problem with this method is that the white to black and black to white transitions can be greatly distorted by incorrect threshold set-up due to circuit delay or different peak levels of the signal. Thus, for all the foregoing reasons, the "delay and compare" method has not proven to be optimal for use in bar code scanners.

A second signal processing method which has sometimes been employed in bar code scanners is the "threshold and compare" method. According to this method, one or more threshold signals are first formed by averaging the analog signal, such as by passing it through a filter or peak detector. As with the "delay and compare" approach, the threshold signals are then compared with the analog signal, and a digital signal is produced by starting and stopping the generation of digital pulses at the points where the threshold signals intersect the analog signal.

A first problem with this method is that it has little or no inherent noise immunity, in that any noise spikes on the analog signal that happen to cross the threshold signal will erroneously trigger the starting or stopping of a digital pulse.

A second problem with the "threshold and compare" method is that it will not successfully digitize high frequency analog signals, i.e., those produced by narrow bars, or those produced by rapidly scanning the light across the bars. This is because for high frequency signals, the method will not produce threshold signals fast enough which accurately represent the average of the analog signal at a particular point in time.

A third problem with this method is that, as with the "delay and compare" approach, the transitions can be distorted due to incorrect threshold set-up as a result of circuit delays or different peak levels of the signal. Thus, this method has not proven optimal either for use in bar code scanning.

A third method which has sometimes been employed in bar code scanners is a second derivative-based method described more fully in U.S. Pat. No. 4,000,397, which is hereby fully incorporated by reference herein as though set forth in full.

According to this approach, a signal representing the second derivative of the analog signal is formed, and a digital signal is then formed by starting and stopping the generation of digital pulses at the zero crossings of the second derivative signal. To minimize the erroneous detection of a zero crossing, the second derivative signal is only evaluated for the presence of zero crossings during selected gating periods. By using this approach, thresholding becomes less critical because the signal levels are produced from the transition of black to white or white to black bars.

A first problem with this method is that the circuitry required to implement it has heretofore been very bulky and complex, making it difficult to use in hand-held bar code scanners. There are numerous reasons for this, including the requirement that both 5V and 12V power supplies be used, the high bandwidth requirements of fixed scanners, and the corresponding use of bulky components such as inductors to form the high-Q filters needed to achieve high bandwidth, and the sheer complexity of the circuitry needed to define the gating periods.

For example, in the circuit described in U.S. Pat. No. 4,000,397, the gating periods are defined by starting and stopping the generation of gating pulses at the points where the first derivative of the analog signal crosses a threshold signal. Complex circuitry is required both to form the first derivative signal and the threshold signal.

A second problem with this approach is that the threshold signal used to form the gating pulses is not fixed, but, in a process known as active thresholding, is typically formed by peak-detecting the input signal. Consequently, this method will typically be susceptible to noise spikes for the same reasons discussed above with respect to the "threshold and compare" approach. For all these reasons, this method has not proven optimal either particularly for use in hand-held bar code scanners.

Accordingly, while those in the art have long recognized a need for a signal processing apparatus and method which has better properties compared to prior art methods with respect to compactness, noise immunity, depth of field, handling of weak signals, handling of signals at the dead angle, rapid formation of threshold signals, reduced distortion, or the like, no such apparatus and method has heretofore become available. Accordingly, an object of the present invention is to provide a signal processing apparatus and method which provides better properties along these lines.

Moreover, while those in the art have long recognized a need for a compact and cost effective derivative-based signal processing apparatus and method for use in hand-held bar code scanners, to date, no such apparatus and method has become available. It is believed that the complexity and size of the circuitry heretofore required to implement this method has deterred its use in hand-held bar code scanners in favor of the "delay and compare" and "threshold and compare" methods. Consequently, another object is to provide a derivative-based signal processing apparatus and method which is more suitable for being used in a hand-held bar code scanner.

Additional objects and advantages of the invention will be set forth in the description which follows or may be learned by practice of the invention.

SUMMARY OF THE INVENTION

The present invention is a signal processing apparatus and method for use in a bar code scanner in which a bar code symbol is capable of being scanned more than once, and in which one or more signal processing parameters, such as threshold level, overall amplification, or overall bandpass, can be varied from scan to scan, resulting in an improved read rate compared with conventional methods.

Additionally, the present invention is a derivative-based signal processing apparatus and method which is compact enough to be readily employed in hand-held bar code scanners. To achieve this objective, the apparatus employs at least one compact active filter to form a derivative signal representative of a derivative of the incoming analog signal. The filter is configured to have a frequency response sufficient to satisfy the bandwidth requirements of hand-held bar code scanners, i.e., 500 Hz-100 KHz, and to avoid the necessity of multiple power supplies. Moreover, the apparatus utilizes a simplified approach to form the threshold signal used to define the gating periods. Specifically the threshold signal in the present invention is set at a fixed level throughout a scan, although it can vary from scan to scan. Further, the apparatus avoids the use of bulky optical filters or the like to filter out low frequency noise or ambient light from the incoming signal. Instead, a high-frequency periodic wave is modulated by the scan line passing over the bar code symbol which enables low frequency noise and ambient light to be filtered out with a simple high-pass filter.

BRIEF DESCRIPTION OF THE DRAWINGS

FIG. 1 depicts an overall block diagram of a signal processing circuit configured in accordance with the present invention;

FIG. 2a depicts a carrier signal as modulated by scanning over a bar code symbol;

FIG. 2b depicts the modulated carrier signal after being passed through a detector circuit and low pass filter;

FIGS. 4a-4c depict the waveforms at various points within the derivative & threshold section of the circuit of FIG. 3;

FIGS. 6a-6e depict the waveforms at various points within the gating & signal section of the circuit of FIG. 3;

FIGS. 7a-7g depict detailed exemplary implementation of the circuit of FIG. 3.

DESCRIPTION OF THE PREFERRED EMBODIMENTS

Figure 3:
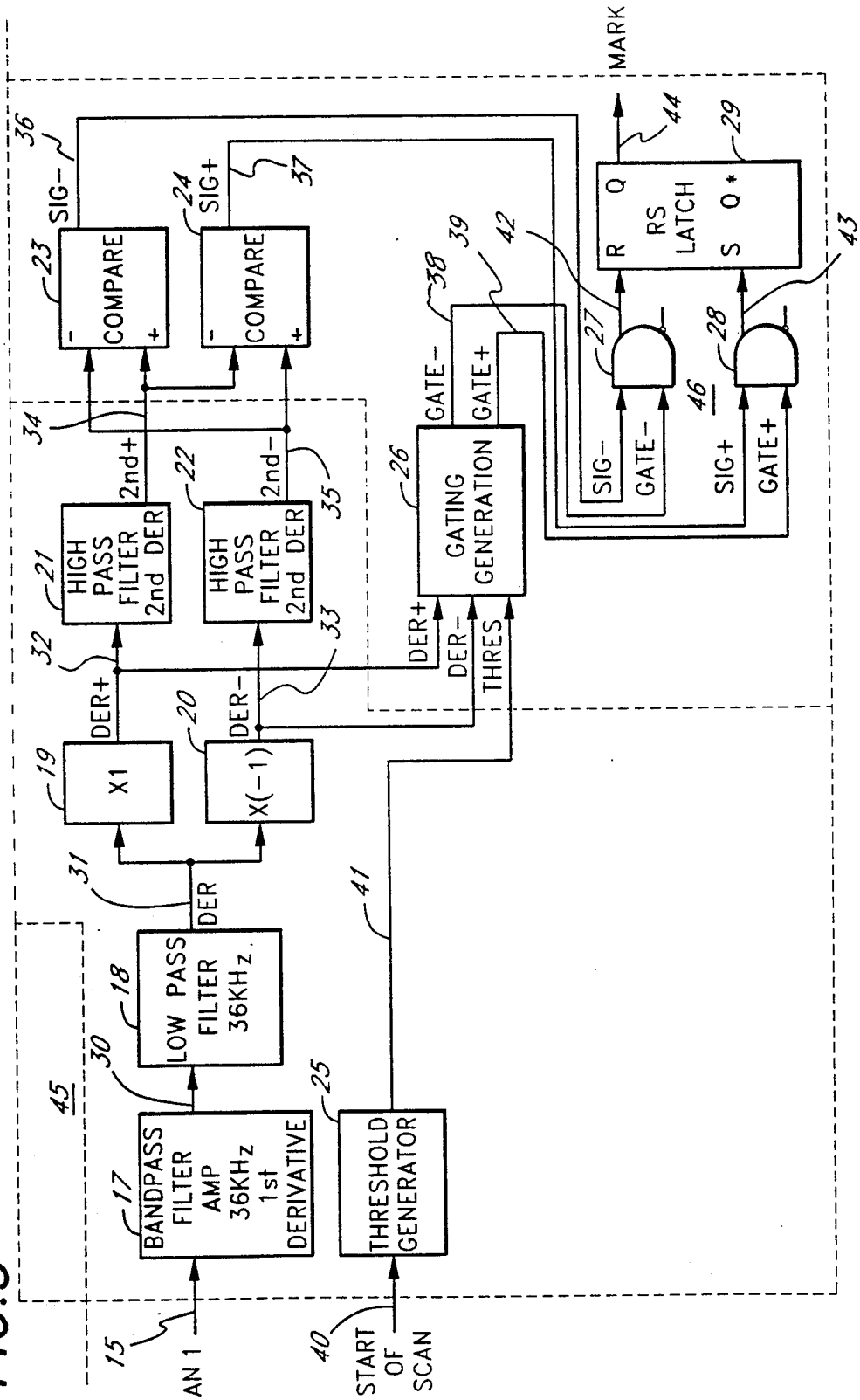
FIG. 3 depicts a digitizing circuit configured in accordance with the present invention.

An overall block diagram of a preferred embodiment of the subject invention is illustrated in FIG. 1. As shown, the embodiment comprises pre-amplifier 1, high pass filter 2, low pass filter 3, peak detector circuit 4, digitizing circuit 5, and motion sense circuit 6, all of which are coupled together as shown.

The input signal to pre-amplifier 1 will be generated by a light detector after intercepting the reflected light off of a bar code signal. Preferably, the input signal provided by the detector is of the form shown in FIG. 2a, that is comprising a high frequency carrier signal 7 which is scanned over the bar code symbol, and therefore modulated with the intensity of the reflected light 8 from the symbol. Advantageously, the carrier signal is a square or sine wave having a frequency of 455 KHz (hereinafter the "carrier signal"), but it should be noted that other waveforms and frequencies are possible.

Turning back to FIG. 1, the function of the pre-amplifier is to amplify the input signal by an amount inversely proportional to the AGC signal 10 which is generated by the peak detector circuit 4. The resultant amplified signal 13 is then input to high pass filter 2, which functions to pass all components of signal 13 at 250 KHz and above, and to filter out all components below 250 KHz. The effect is to filter out unwanted low frequency components which have been introduced from various sources, such as ambient light and power supply noise.

Filtered signal 14 is then input to a detector circuit and low pass filter 3, which could be synchronous, single-side band, or double side-band envelope. This circuit and filter 3 functions to pass only low frequency components, and filter out high frequency components. The effect is to remove the carrier signal 7 shown in FIG. 2a, and to leave only the low frequency envelope 8 in the signal, so that the resultant signal 15 is more representative of the reflected light intensity off the bar code symbol. The resultant signal 15 is illustrated in FIG. 2b.

Signal 15 is then input to peak detector circuit 4 which functions to detect the peak voltage of the signal 15. The circuit also produces AGC signal 10 which is input to the pre-amplifier 1, and is used to reduce or increase the amount of amplification as the peak voltage changes in order to maintain a constant amplification. The effect is to keep the signal amplitude constant to minimize distortion from weak to strong signals off the detector.

The signal 15 is also input to digitizing circuit 5, which functions to produce a digital signal 16, where the width of the pulses making up the signal corresponds to the width of the bars in the bar code being scanned.

A block diagram of the digitizing circuit 5 is shown in FIG. 3. As shown, this circuit comprises bandpass filter 17, low pass filter 18, unity gain buffers 19 and 20, high pass filters 21 and 22, comparators 23 and 24, threshold generator 25, gating generator 26, AND gates 27 and 28, and flip-flop 29, all coupled together as shown in the figure.

The operation of the digitizing circuit begins with the input of signal 15 to bandpass filter 17. The bandpass filter functions to produce signal 30, which is the first derivative of signal 15. The output of the bandpass filter 30 is then input to low pass filter 18, which functions to make the first derivative signal 30 more uniform.

The resultant signal 31, labelled as the DER signal, is then input to unity gain buffers 19 and 20, which differ insofar as buffer 19 is configured to have a gain of +1, while buffer 20 is configured to have a gain of −1. The resultant signals, DER+ signal 32 and DER− signal 33, are complements of each other. These signals are then input to high pass filters 21 and 22, respectively.

These high pass filters function to form the second derivative of the signal 15. The resultant signals, 2nd+ signal 34 and 2nd− signal 35, are also complements of each other. These signals are then both input to comparators 23 and 24, with the 2nd− signal being input to the −input of comparator 23 and the + input of comparator 24, and the 2nd+ signal being input to the + input of comparator 23 and the −input of comparator 24. The function of the comparators is to detect when the second derivative of the input signal has undergone a transition point commonly known as a "zero crossing." A zero crossing represents a transition from a black to white bar or vice-versa in the analog signal. In the present embodiment, a zero crossing is determined to occur when the 2nd+ and 2nd− signals intersect each other. Alternatively, a zero crossing can be determined to occur when the 2nd+ signal makes a negative going transition through 0 volts.

The output of the comparators, SIG+ signal 36 and SIG-signal 37, are respectively input to AND gates 27 and 28. The other inputs to the AND gates are GATE− signal 38 and GATE+ signal 39, the generation of which will now be described.

With reference to FIG. 1, a motion sense circuit 6 is provided, and one function of this circuit is to generate a pulse at the beginning of each scan. The pulse which is generated is output on START OF SCAN ("SOS") signal 40. With reference to FIG. 3, threshold generator 25 takes as input the SOS signal 40, and generates a threshold level on THRESH signal 41 when a pulse appears on the SOS signal 40. Thus, a threshold level will be determined for every scan. The threshold level for a scan is advantageously a fixed value which is not determined through conventional means, i.e., by peak detection or filtering, and is therefore independent of the analog signal throughout the scan. Rather, the threshold level will advantageously be determined in a way to provide better noise immunity and depth of field than available through these conventional approaches. Preferably, the threshold level is "toggled" between different values on successive scans of the same symbol. For example, the threshold level could be "toggled" between high and low levels on successive scans with the high level determined appropriate for far field labels or large labels, and the low level determined appropriate for near field labels or small labels. The digital signals from the various scans are then compared, and the one which best represents the analog signal, as determined by a check sum digit, parity check, or other known method, is retained for further processing. It has been found that such an approach dramatically improves the read rate which can be achieved.

Moreover, this technique of using the SOS signal can also be employed to "toggle" gain or bandpass in order to improve scanner depth of field capability. For example, these parameters could be set on a first scan in a manner determined appropriate to process weak signals, far field labels, or large labels, such as by increasing the amplification and decreasing the bandwidth from nominal values. Then, on a successive scan of the same symbol, the parameters could be set in a manner determined appropriate for another type of symbol or label, e.g., near field labels or small labels, such as by decreasing the amplification and increasing the bandwidth from nominal values. Other examples are possible, including where other parameters are varied, or where the parameters are "toggled" over more than two scans, and it should be appreciated that the above description is not meant to be limiting.

Turning back to FIG. 3, the THRESH signal is input to gating generator 26 along with the DER+ and DER− signals discussed previously. The function of the gating generator 26 is to generate gating pulses which define gating periods during which the SIG− and SIG+ signals are evaluated for a zero crossing.

The SIG− signal is then ANDed with the GATE− signal by means of AND gate 27, and the resultant output, signal 42, is then input to the RESET input of flip-flop 29. Similarly, the SIG+ signal is ANDed with the GATE+ signal by means of AND gate 28, and the resultant output, signal 43, is then input to the SET input of flip-flop 29.

Accordingly, when a zero-crossing appears on the SIG− signal during the period defined by the GATE−signal, the output of the flip-flop will be reset to a logical "0," while when a zero-crossing appears on the SIG+ signal during the period defined by the GATE+ signal, the output of the flip-flop will be set to a logical "1." In this manner, the digital signal discussed at the outset will be formed at 44.

The method of operation of the digitizing circuit 5 will now be explained in more detail with reference to FIGS. 4a–4c, 5a–5c, and 6a–6e, which show the waveforms which are generated at various points within the digitizing circuit.

Turning to FIG. 3, the digitizing circuit consists of two sections: derivative & threshold section 45, and gating & signal section 46. Derivative & threshold section 45 can be explained with reference to FIGS. 4a–4c and 5a-5c (with FIGS. 5a-5c simply being a zoomed version of FIGS. 4a-4c), while the gating & signal section 46 can be explained with reference to FIGS. 6a-6e.

Figure 4C:
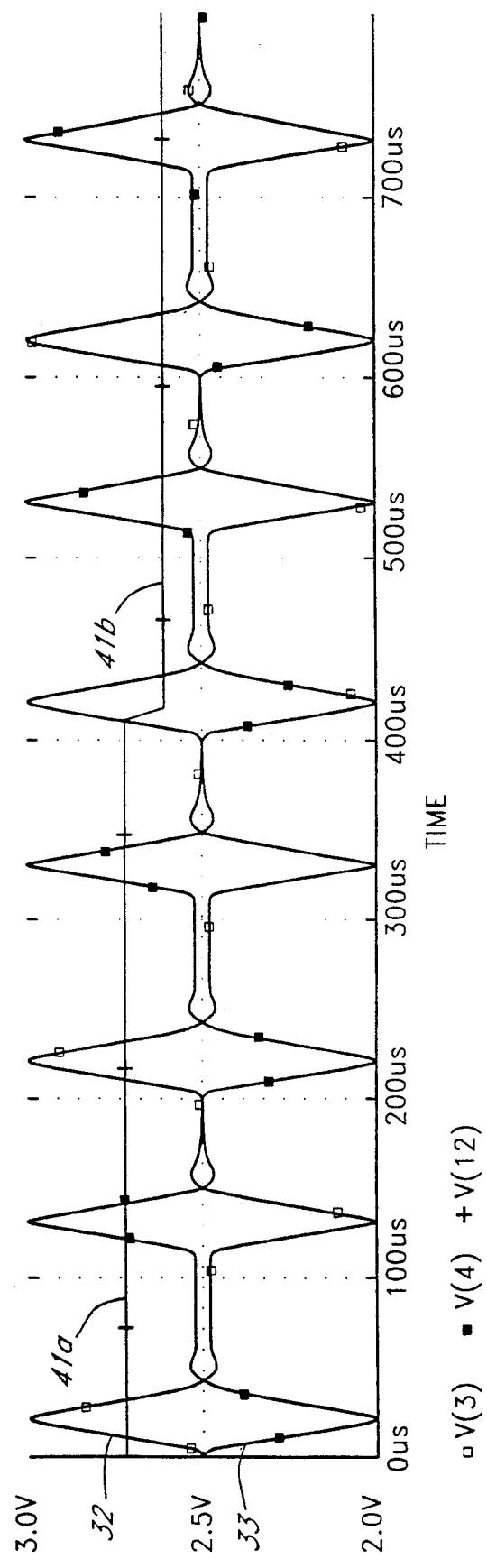

Turning to FIGS. 4a-4c, FIG. 4a illustrates signal 15 as input to bandpass filter 17, and the rest of the figures show waveforms which appear at various points throughout the circuit in response to the input signal. For illustration purposes only, the input signal shown resembles a square wave, and it should be understood that an input signal as used in the field will more closely resemble a sine wave. A square wave was chosen since it has steeper transitions than a sine wave, and better illustrates the principles of operation of the circuit as embodied in the resultant waveforms.

Turning to the remaining drawings of FIG. 4, FIG. 4b illustrates the 2nd+ and 2nd− signals previously identified with reference numerals 34 and 35, respectively. FIG. 4c illustrates the DER+, and DER− signals previously identified with reference numerals 32 and 33, respectively.

Also illustrated in FIG. 4c is the threshold signal 41. As discussed earlier, the threshold level for a scan is advantageously set at a fixed value throughout the scan. However, the subject invention also provides the ability to vary the threshold level from scan to scan, depending on the particular scanning environment, or to scan the same symbol more than once, with the threshold level being varied on successive scans. For better noise immunity, or to better handle far field labels or large labels, the threshold level should be set to a relatively high value, as illustrated by numeral 41a in FIG. 4c. On the other hand, to better handle weak symbols, low contrast labels, near field labels, or small labels, the threshold level should be set to a lower value, as illustrated by numeral 41b in FIG. 4c.

Figure 6C:
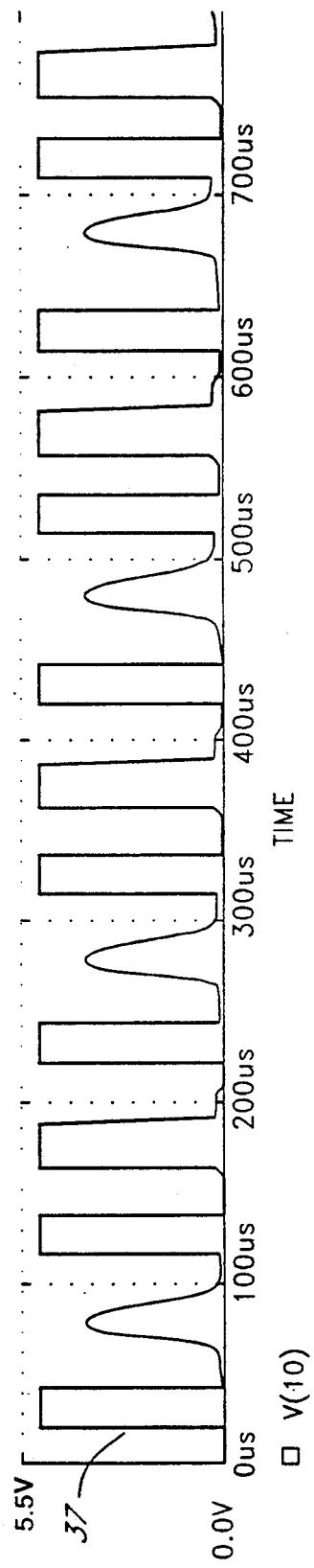
Figure 6D:
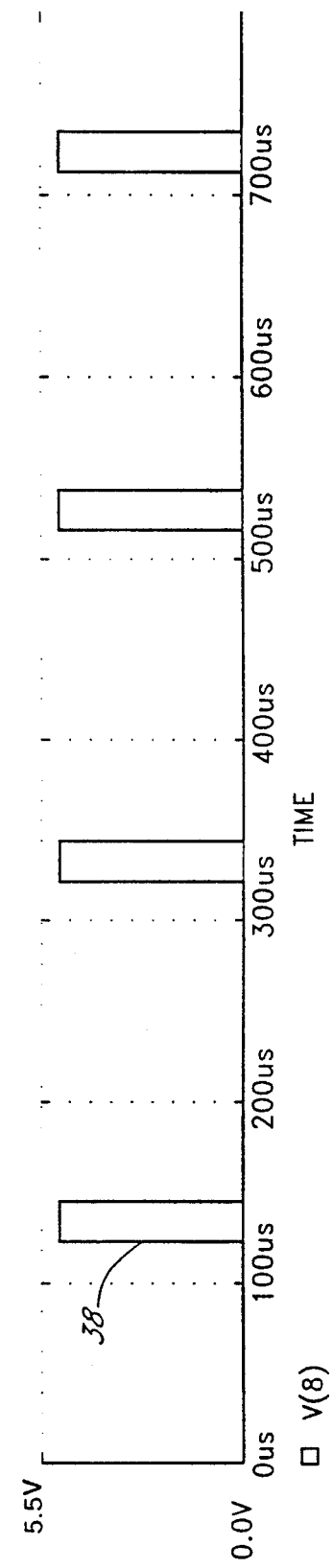
Figure 6E:
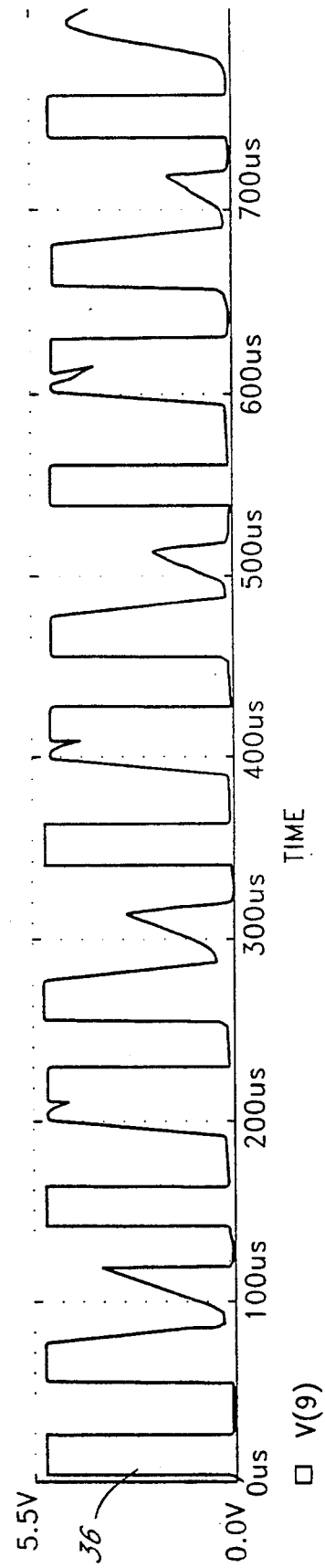
Figure 7B:
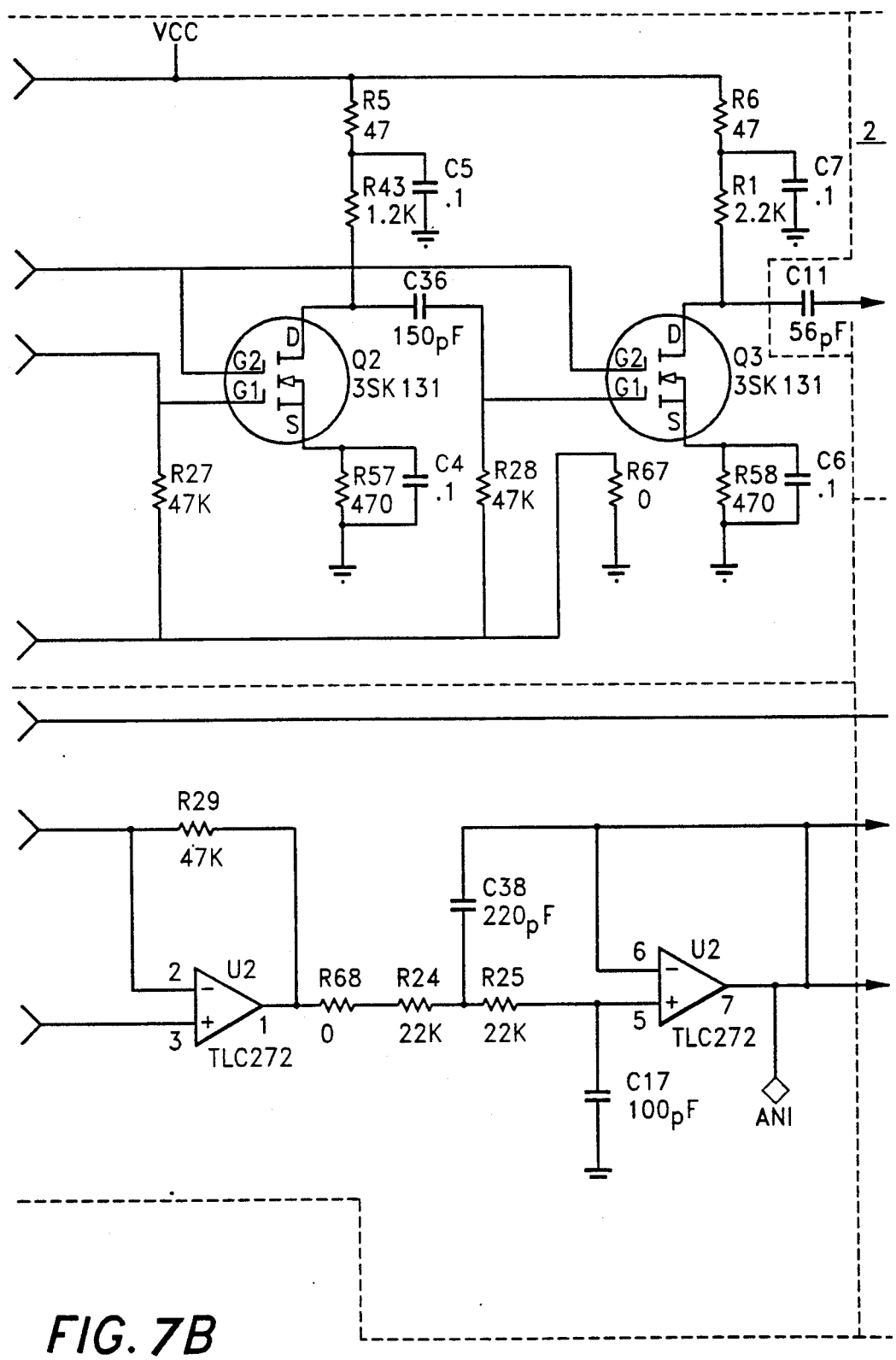
Figure 7C:
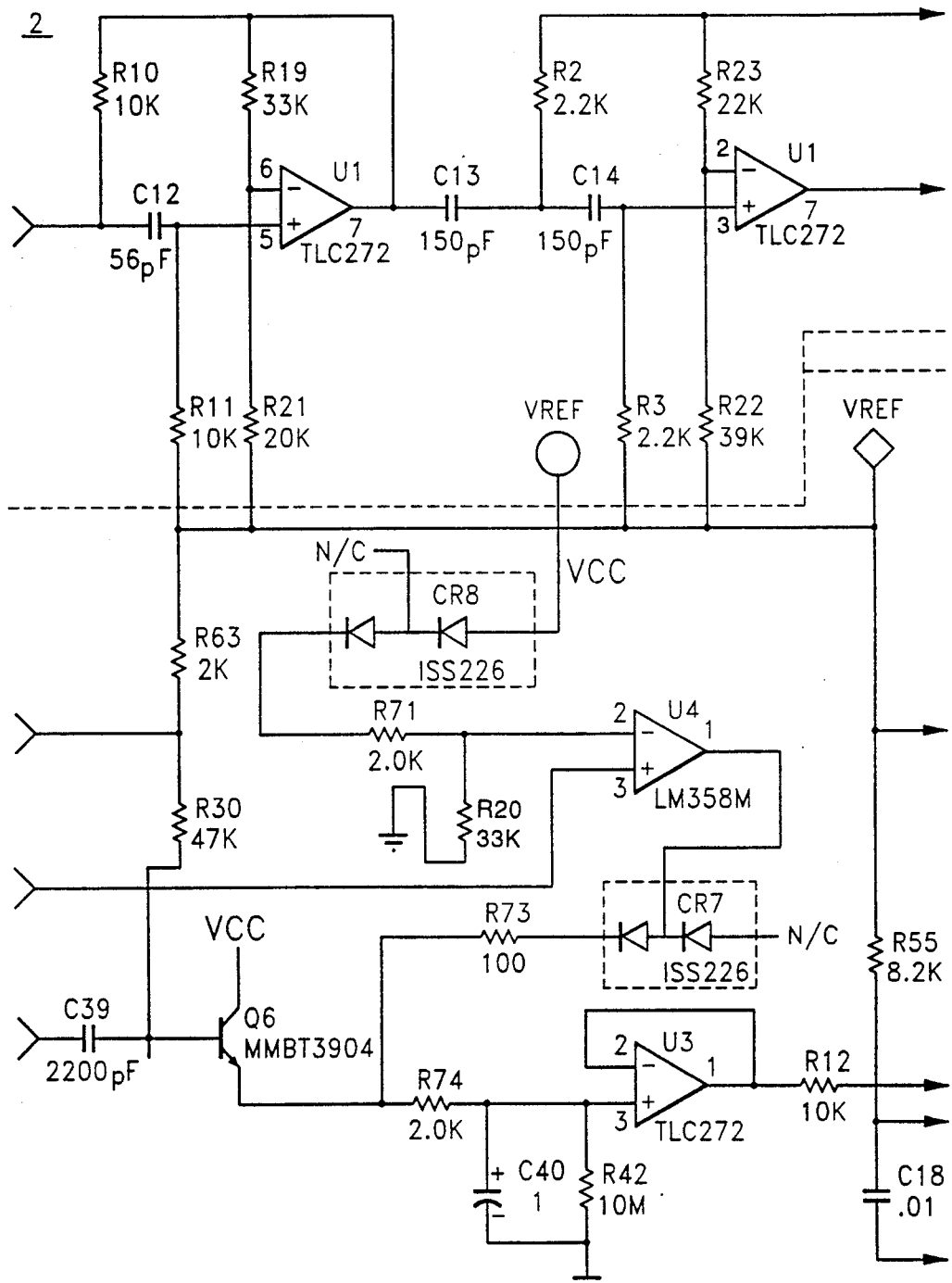
Figure 7D:
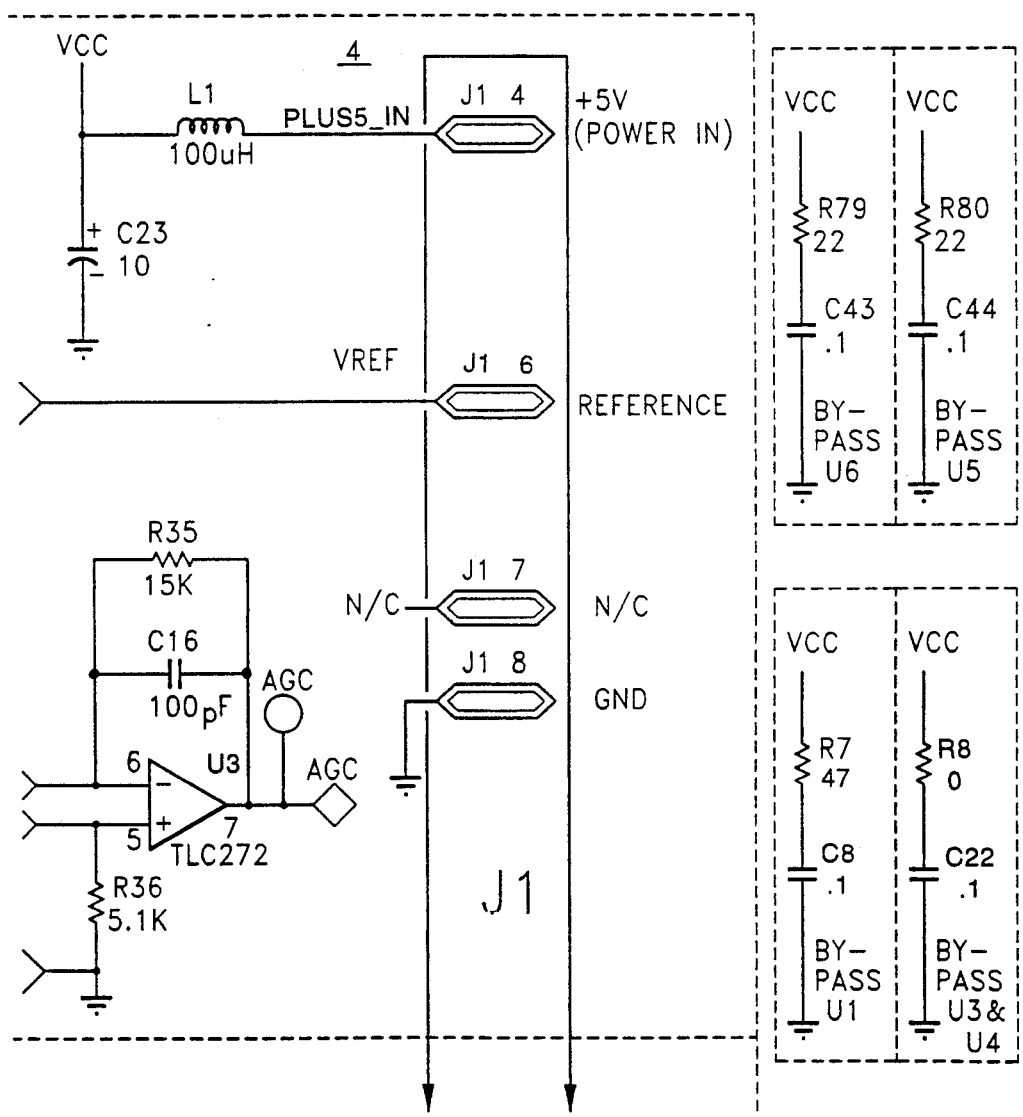
Figure 7E:
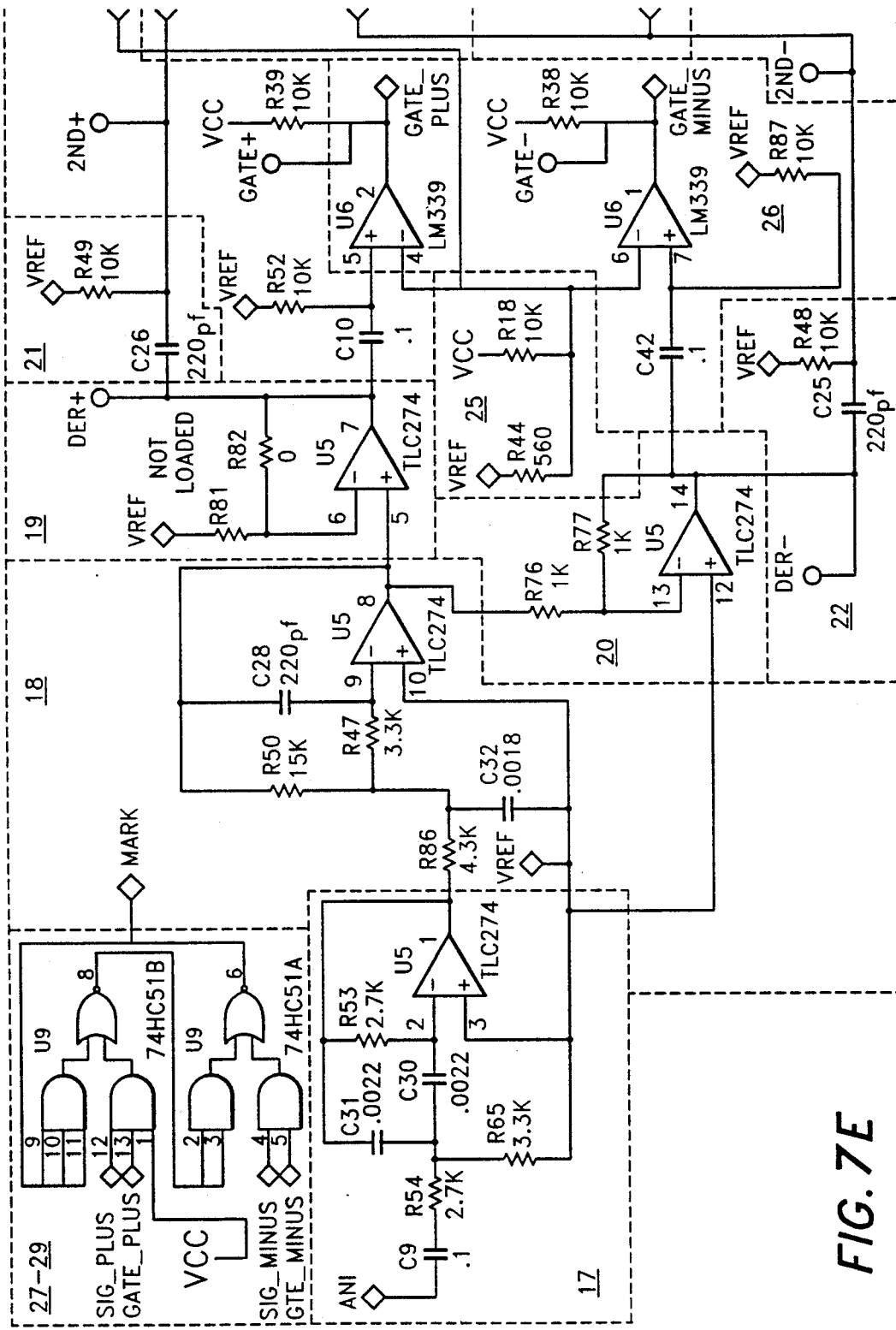
Figure 7F:
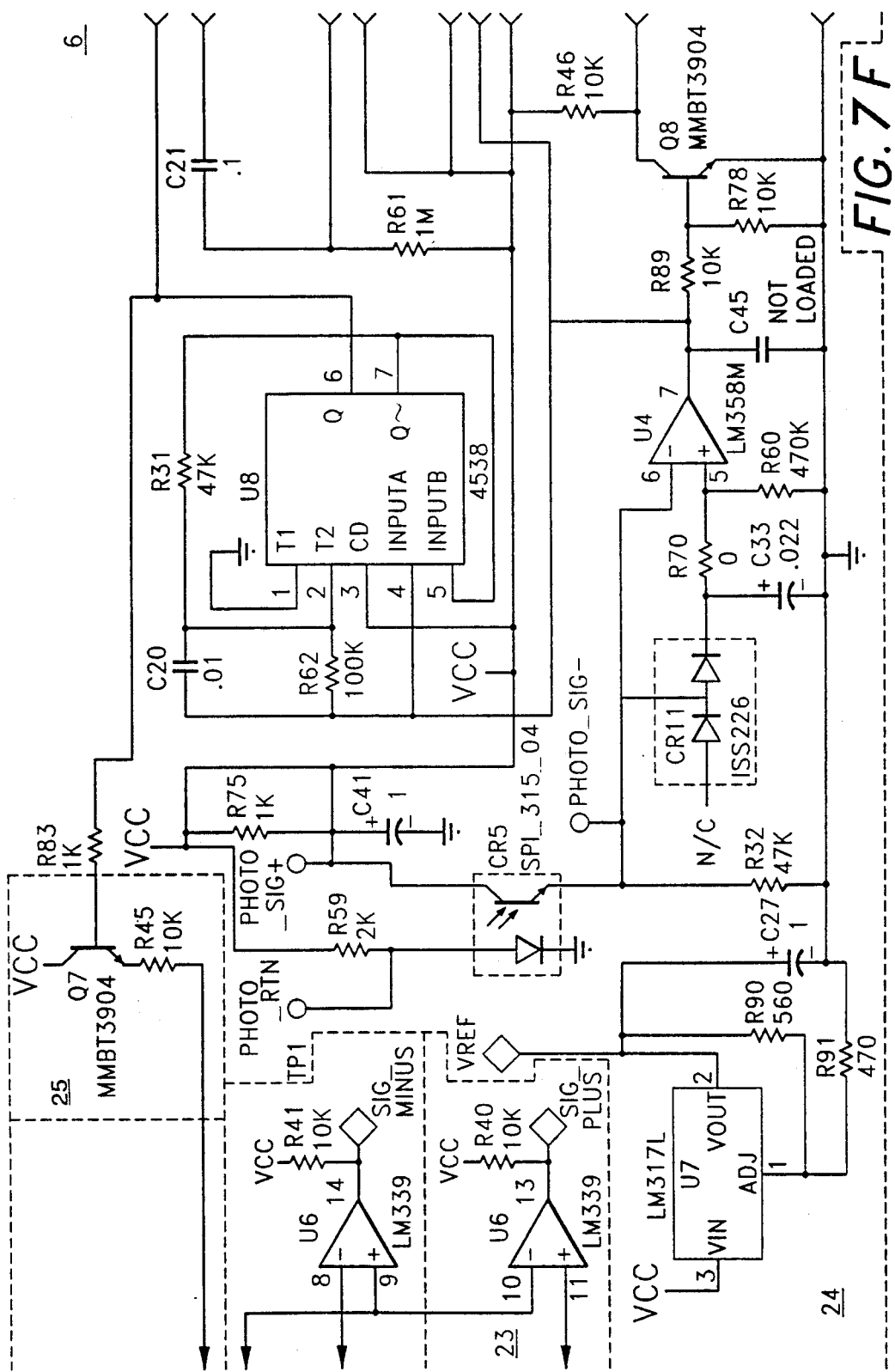
Figure 7G:
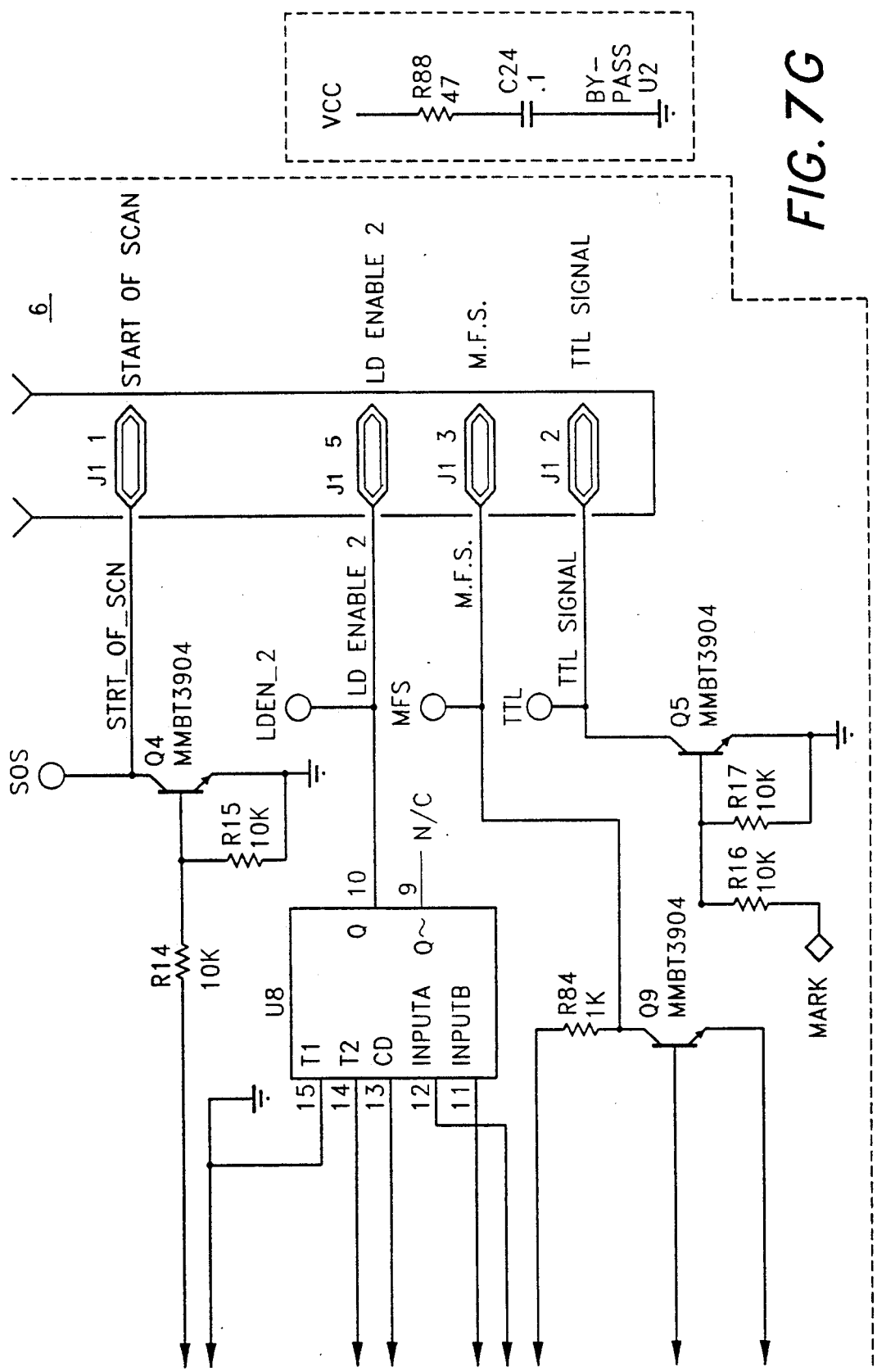

Turning to FIGS. 6a-6e, these figures illustrate the waveforms found at various points within the gating & signal section 46 of the digitizing circuit. Specifically, FIG. 6c illustrates the SIG+ signal, previously identified with numeral 37, while FIG. 6e illustrates the SIG− signal, previously identified with numeral 36. As is indicated by the presence of comparators 23 and 24 in FIG. 3, and by the shape of the waveform of FIGS. 6c and 6e, the SIG− signal is formed by comparing the 2nd+ signal with the 2nd− signal, and outputting a signal proportional to the difference between the 2nd+ signal and the 2nd− signal, while the SIG+ signal is formed by comparing the 2nd− signal with the 2nd+ signal, and outputting a signal proportional to the difference between the 2nd− signal and the 2nd+ signal. Consequently, a positive going transition will be formed on the SIG+ signal whenever the 2nd− signal intersects the 2nd+ signal on a positive going transition, while a positive going transition will be formed on the SIG− signal whenever the 2nd+ signal intersects the 2nd− signal on a positive going transition.

Next, FIG. 6b illustrates the GATE+ signal, previously identified with numeral 39, while FIG. 6d illustrates the GATE-signal, previously identified with numeral 38. Again, as illustrated by the shape of the waveforms in FIGS. 6b and 6d, the GATE+ signal is formed by comparing the DER+ signal with the threshold level, and starting the generation of a gating pulse when the DER+ signal intersects the threshold on a positive going transition and stopping the generation when the DER+ signal intersects the threshold on a negative going transition, while the GATE− signal is formed by comparing the DER− signal with the threshold level, and starting the generation of a gating pulse when the DER− signal intersects the threshold on a positive going transition, and stopping the generation when the DER− signal intersects the threshold on a negative going transition.

Turning back to FIG. 3, as illustrated, the function of AND gates 27 and 28 is to only allow the passage of the SIG+ and SIG− signals during the defined gating periods. Consequently, whenever the SIG− signal makes a positive going transition during the gating period, the flip-flop will be reset, that is transition from logical "1" to "0," and whenever the SIG+ signal makes a positive going transition during the gating period, the flip-flop will be set, that is transition from logical "0" to "1."

Turning to FIG. 7, an exemplary embodiment of the overall circuit of FIG. 3 is shown. To facilitate a comparison between FIGS. 3 and 7, the circuit elements of FIG. 7 have been grouped into blocks, each of which corresponds to one of the blocks shown in FIG. 3. In this way, the particular circuit elements making up a particular block can be determined.

For example, the bandpass filter of the digitizing circuit is identified with numeral 17. As shown in FIG. 7, the circuit elements making up the bandpass filter include C9, R54, C31, C30, R65, R53, and U5.

Figure 8A:
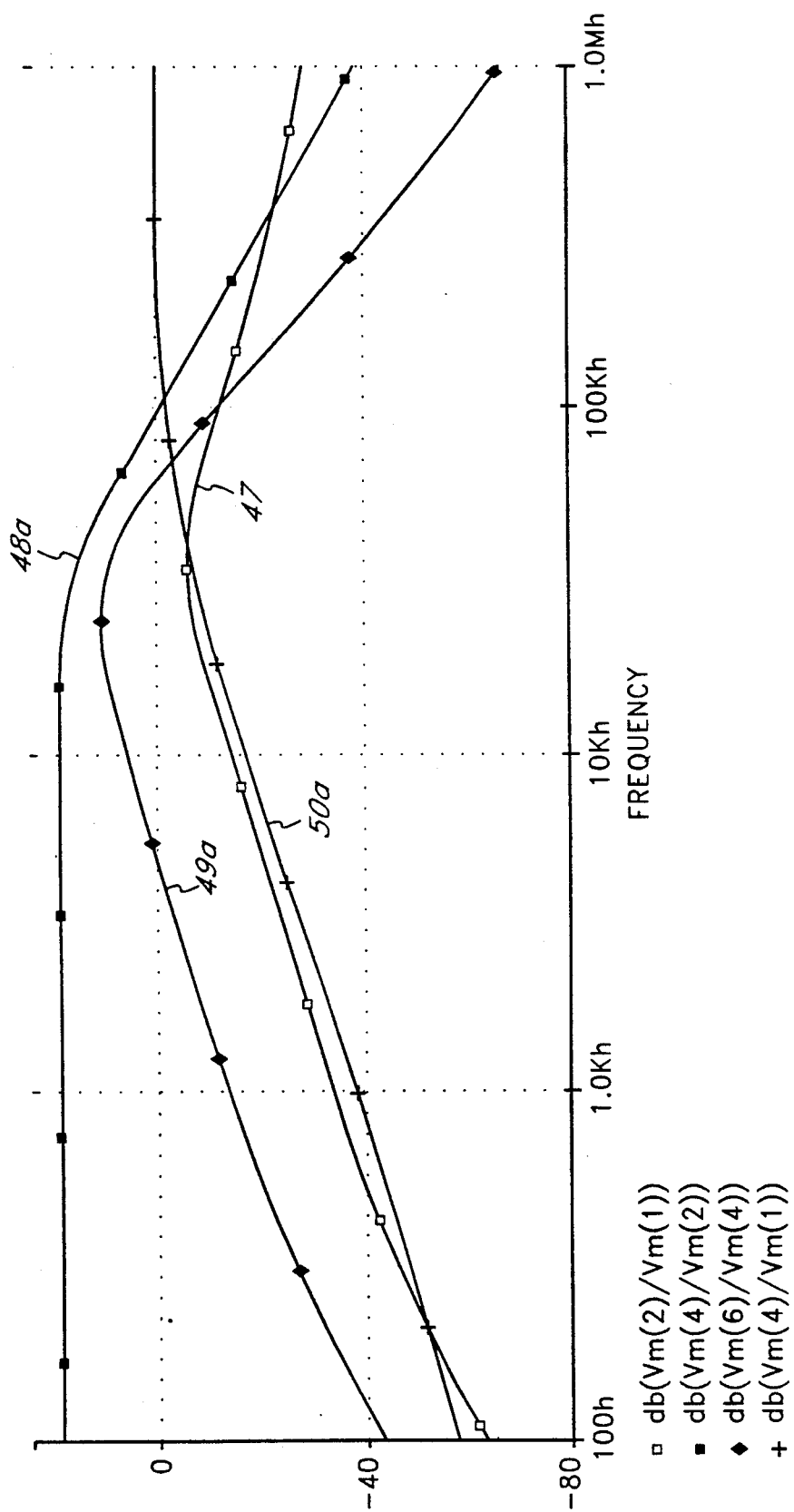
FIGS. 8a-8b depict the frequency response of various stages of the circuit of FIG. 7.
Figure 8B:
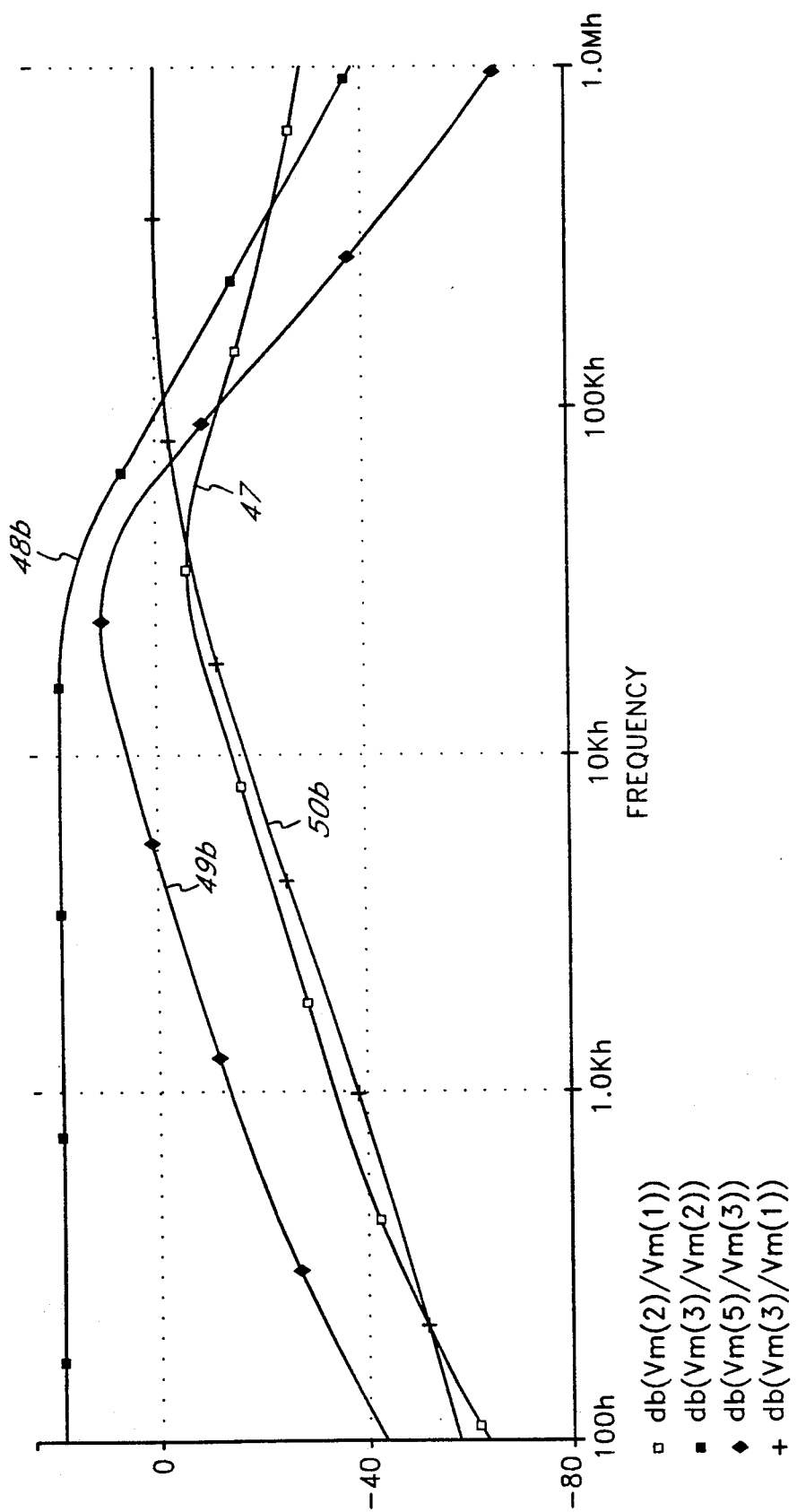

The overall frequency responses of the various blocks making up the digitizing circuit, illustrated in FIG. 3, are shown in FIGS. 8a-8b.

Turning to these figures, the curve identified with numeral 47 is a plot of the frequency response of bandpass filter 17, the curve identified with numeral 48a is a plot of the frequency response of the combination of low pass filter 18 and buffer 19, the curve identified with numeral 48b is a plot of the frequency response of the combination of low pass filter 18 and buffer 20, the curve identified with numeral 50a is a plot of the frequency response of high pass filter 21, the curve identified with numeral 50b is a plot of the frequency response of high pass filter 22, the curve identified with numeral 49a is a plot of the frequency response of the combination of bandpass filter 17, low pass filter 18, and buffer 19, while the curve identified with numeral 49b is a plot of the frequency response of the combination of bandpass filter 17, low pass filter 18, and buffer 20.

The following table summarizes this correspondence:

| Plot Number | Value Plotted |
|---|---|
| 47 | dB (output signal 30/input signal 15) |
| 48a | dB (DER+/output signal 30) |
| 48b | dB (DER−/output signal 30) |
| 50a | dB (2nd+/DER+) |
| 50b | dB (2nd−/DER−) |
| 49a | dB (DER+/input signal 15) |
| 49b | dB (DER−/input signal 15) |

As can be seen, curves 48a and 48b appear identical, which is to be expected, since DER− is simply the complement of DER+. Curves 50a and 50b, and 49a and 49b appear identical for similar reasons.

As illustrated in FIGS. 8a-8b, bandpass filter 17, in the particular circuit shown in FIG. 7, is configured to have 3 dB points (poles) at 1 KHz and 36 KHz, with an overall amplification of 0.5; low pass filter 18 is configured to have a pole at 36 KHz with a gain of 3.5; high pass filters 21 and 22 are configured to have a pole at 72 KHz with a gain of unity; and the combination of the bandpass and low pass filters is configured to have poles at 1 KHz and 36 KHz with a gain of 1.81. It should be understood that the above figures are meant to be exemplary, and not limiting, and that other values are possible.

For example, circuitry having a bandwidth in the range of 500 KHz-100 KHz is suitable for use in a hand-held bar code scanner, and is therefore intended to be within the scope of the subject invention. Moreover, circuitry having a bandwidth in the range of 10 KHz-1 MHz is suitable for use in a fixed scanner, because of the different throughput requirements, and is also intended to be within the scope of the subject invention.

An aspect of the subject invention is the us of single power-supply active filters, that is filters which are built from single power-supply operational amplifiers or the like, at least when the subject invention is intended for use in hand-held scanners since it has been found that these operational amplifiers provide sufficient bandwidth for use in hand-held scanners. For use in fixed scanners, it may be necessary to use dual-power supply operational amplifiers to meet the greater bandwidth, slew rate, and dynamic range requirements.

Figure 5A:
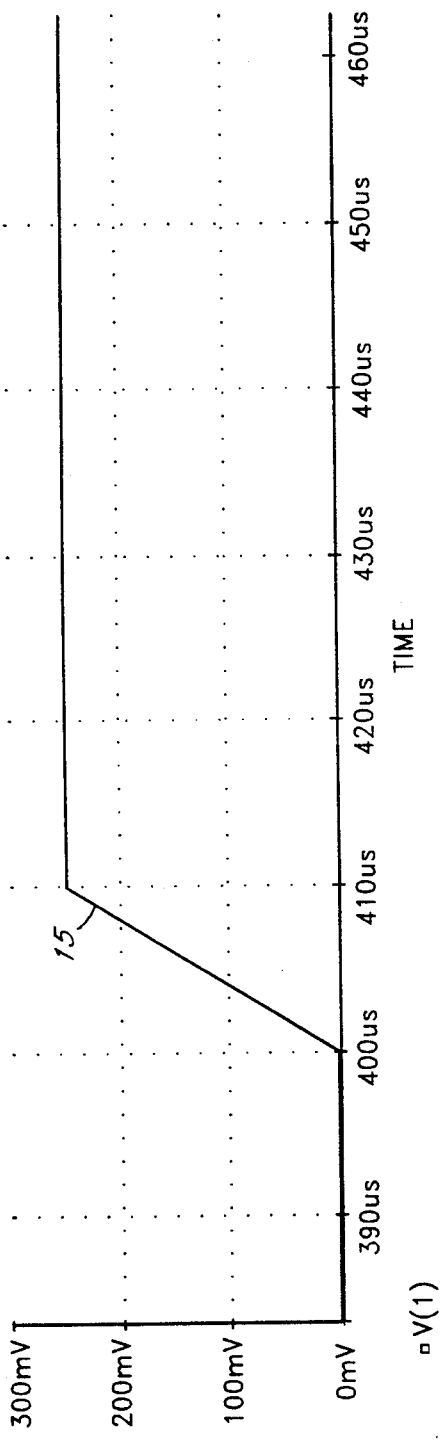
FIGS. 5a-5c depict a zoomed version of the waveforms of FIGS. 4a-4c.
Figure 5B:
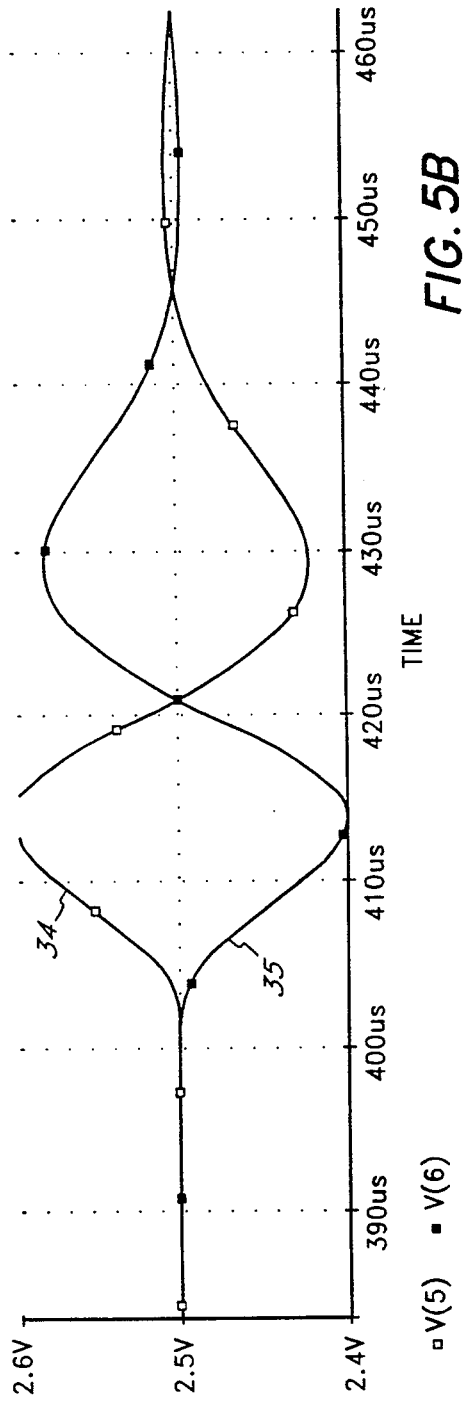
Figure 5C:
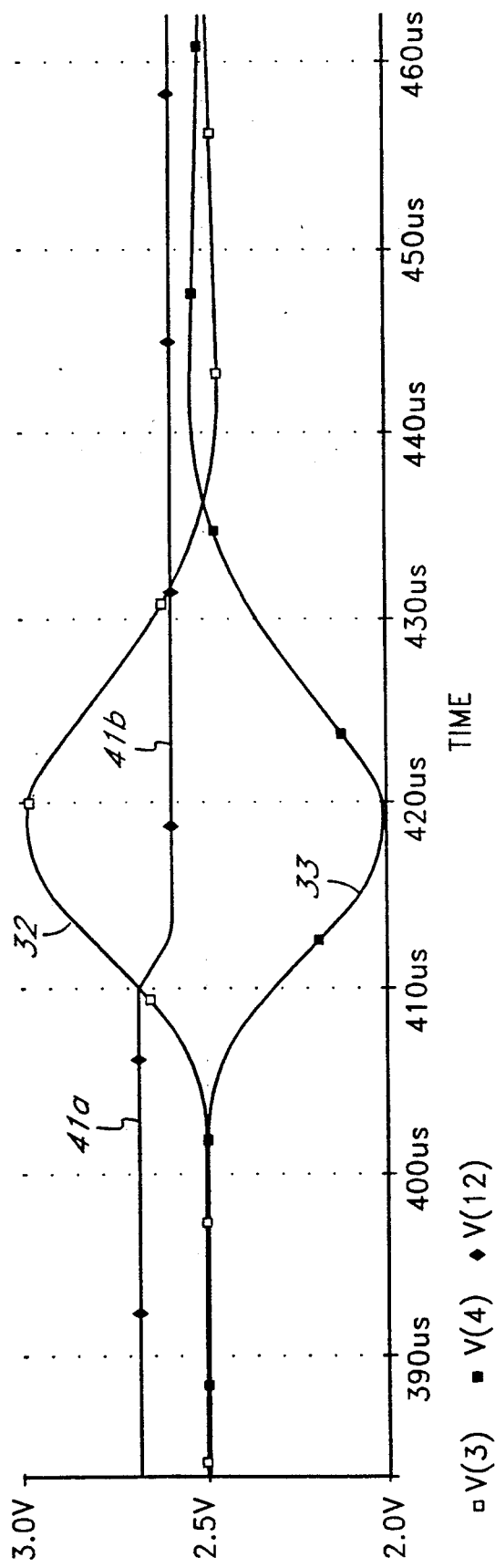

Turning back to the figures, as illustrated in FIG. 5c, in an exemplary embodiment of the subject invention, each bar code symbol is scanned twice, with the threshold level toggled between 2.7V and 2.6V on successive scans. It is also possible to vary other processing parameters, such as overall amplification or bandpass, between successive scans to improve the read rate, such as by switching different component values in and out of the filters 17 and 18 using a switching matrix.

Nominal values for these parameters in the circuit of FIG. 7 are 1.81 and 1 KHz-36 KHz, respectively, and this is what is achieved by the circuit of FIG. 7. In order to improve read rate, these parameters could be varied over successive scans just as the threshold level could be varied. On one scan, the amplification could be increased and the bandpass decreased from the nominal values to facilitate the reading of far field or large labels, and on the next scan, the amplification could be decreased, and the bandpass increased from the nominal values to facilitate the handling of near field or small labels. To increase the bandpass in the circuit of FIG. 7, either the 1 KHz pole of bandpass circuit 17 could be lowered, or alternatively, the 36 KHz poles of both bandpass circuit 17 and low pass filter 18 could be increased. Conversely, to decrease the bandpass in this circuit, either the 1 KHz pole of bandpass circuit 17 could be increased, or alternatively, the 36 KHz poles of both bandpass circuit 17 and low pass filter 18 could be decreased.

It should be apparent that the subject invention is superior to previous signal processing apparatus and methods. Compared to the "delay and compare" or "threshold and compare" approach, the subject invention, insofar as it is derivative-based, overcomes the limitations of these two methods. Compared to the method of U.S. Pat. No. 4,000,397, the subject invention provides a derivative-based apparatus and method which is compact enough to be successfully employed in hand-held bar code scanners. Moreover, compared to this method, the subject invention, insofar as it provides a capability to vary threshold levels, amplification, bandpass, or the like, on successive scans of the same symbol, provides reduced distortion and greater noise immunity.

While modifications, embodiments, and applications of this invention have been shown and described, it should be apparent to those skilled in the art that many more modifications, embodiments, and applications are possible without departing from the invention concepts herein. The invention, therefore, is not to be restricted, except in the spirit of the appended claims.

What is claimed is:

1. A digitizing circuit comprising:
   first circuit means, configured to have a bandwidth in the range of between about 500 Hz-100 KHz, for forming a first signal representative of a derivative of an analog signal, the analog signal being representative of the intensity of the light reflected off a bar code symbol comprising alternating black and white bars each having a width, and for forming a second signal which is a complement of the first signal; and
   second circuit means coupled to the first circuit means for generating digital pulses on a digital output signal by utilizing the first signal and the second signal to detect transition points on the analog signal, the transition points being determined by the intersection of the first signal and the second signal and representing transitions from black bars to white bars or vice-versa, and by starting and stopping the generation of digital pulses on or about the transition points;
   whereby the width of the digital pulses corresponds to the widths of the bars making up the bar code symbol.

2. The circuit of claim 1 wherein the first circuit means includes an active filter to form the first signal.

3. A digitizing circuit comprising:
   means for receiving an analog input signal, the analog signal being representative of the intensity of light reflected off a bar code symbol, the bar code symbol comprising alternating black and white bars each having a width;
   a threshold generator for providing a threshold signal and for forming a threshold level on the threshold signal during a scan of the bar code symbol, the threshold signal being independent of the analog input signal, and the threshold level capable of being switched from a first level to at least one different level for at least one subsequent scan of the bar code symbol;
   first circuitry for forming a first signal representative of a derivative of the analog signal; and
   second circuitry coupled to the first circuitry and the threshold generator for utilizing the first signal and the threshold signal to detect transition points of the analog signal, representing transitions from black bars to white bars, or vice-versa, and for generating digital pulses on a digital output signal by starting and stopping the generation of digital pulses at or about the transition points;
   whereby the widths of the digital pulses corresponds to the widths of the bars making up the bar code symbol.

4. The circuit of claim 3 wherein each threshold level formed by the threshold generator is fixed in value.

5. The circuit of claim 3 wherein the threshold generator is capable of forming a threshold level for a scan of the symbol which is determined appropriate for near field or small symbols.

6. The circuit of claim 3 wherein the threshold generator is capable of forming a threshold level for a scan of the symbol which is determined appropriate for far field, large, or low contrast symbols.

7. The circuit of claim 3 wherein the threshold generator is capable of forming and alternating between first and second threshold levels on successive scans of the symbol, wherein the first threshold level is determined appropriate for near field or small symbols, and wherein the second threshold level is determined appropriate for far field, large, or low contrast symbols.

8. A digitizing circuit comprising:
first circuitry for forming a first signal representative of a derivative of an analog signal, the analog signal being representative of the intensity of light reflected off a bar code symbol comprising alternating black and white bars each having a width, the first circuitry including at least one filter configured in accordance with a parameter of interest and means for varying the configuration of the at least one filter such that the parameter is a first value for at least one scan of the symbol but may be switched to at least one different value for a least one subsequent scan of the symbol; and
second circuitry coupled to the first circuitry for utilizing the first signal to detect transition points of the analog signal, representing transitions from black bars to white bars, or vice-versa, and for generating digital pulses on a digital output signal, by starting and stopping the generation of the digital pulses at or about the transition points;
whereby the widths of the digital pulses corresponds to the widths of the bars making up the bar code symbol.

9. The circuit of claim 8 wherein the parameter of interest is the overall bandpass, and wherein the at least one filter is configured such that the overall bandpass is appropriate for near field or small symbols.

10. The circuit of claim 8 wherein the parameter of interest is the overall bandpass, and wherein the at least one filter is configured such that the overall bandpass is appropriate for far field, large, or low contrast symbols.

11. The circuit of claim 8 wherein the parameter of interest is the overall amplification, and wherein the at least one filter is configured such that the overall amplification is appropriate for near field or small symbols.

12. The circuit of claim 8 wherein the parameter of interest is the overall amplification, and wherein the at least one filter is configured such that the overall amplification is appropriate for far field, large, or low contrast symbols.

13. The circuit of claim 8 wherein the at least one filter is capable of being configured with and alternating between the first and a second value of the overall bandpass on successive scans of the symbol, wherein the first bandpass is determined appropriate for near field or small symbols, while the second bandpass is determined appropriate for far field, large, or low contrast symbols.

14. The circuit of claim 8 wherein the at least one filter is capable of being configured with and alternating between the first and a second value of the overall amplification on successive scans of the symbol, wherein the first amplification is determined appropriate for near field or small symbols, while the second amplification is determined appropriate for far field, large or low contrast symbols.

15. A digitizing circuit comprising:
first circuitry adapted for use in a hand-held bar code scanner for providing a derivative signal representative of a derivative of an analog signal, the analog signal being representative of the intensity of light reflected off of a bar code symbol comprising alternating black and white bars each having a width, and for forming a signal which is a complement of the derivative signal; and
second circuitry coupled to the first circuitry for detecting transition points on the analog signal utilizing the derivative signal and the complement of the derivative signal, the transition points being determined by the intersection of the derivative signal and the complement of the derivative signal, the transition points representing transitions from black bars to white bars and vice-versa, and for generating digital pulses on a digital output signal by starting and stopping the generation of the digital pulses at or about the transition points;
whereby the widths of the pulses corresponds to the widths of the bars making up the bar code symbol.

16. A signal processing circuit comprising:
first circuitry for modulating a high frequency carrier signal by scanning it across a bar code symbol made up of alternating black and white bars, each having a width, to form a first signal;
second circuitry coupled to the first circuitry for filtering out low frequency noise or ambient light, and also for filtering out the high frequency carrier signal from the first signal, to form a second signal; and
third circuitry coupled to the second circuitry for providing a derivative signal representative of a derivative of the second signal; and
fourth circuitry coupled to the third circuitry for utilizing the derivative signal to detect transition points of the second signal, representing transitions from black to white bars and vice-versa, and also for generating digital pulses on a digital output signal by starting and stopping the generation of the pulses at or about the transition points;
whereby the widths of the pulses corresponds to the widths of the bars making up the bar code symbol.

17. A signal processing circuit comprising:
a pre-amplifier for amplifying an analog signal, representative of the intensity of light reflected off a bar code symbol made up of alternating black and white bars, each having a width, in an amount determined in response to an AGC signal, to provide a first signal;
first circuitry coupled to the pre-amplifier for detecting peaks of the first signal, for providing the AGC signal, and for forming a value on the AGC signal which is determined by the peaks of the first signal as detected, whereby the AGC signal is used by the pre-amplifier to amplify the analog signal in an amount inversely proportional to the peaks of the analog signal as detected; and
second circuitry coupled to the first circuitry for providing a derivative signal representative of a derivative of the first signal; and
third circuitry coupled to the second circuitry for utilizing the derivative signal to detect transition points of the analog signal, representing transitions from black to white bars and vice-versa, and also for generating digital pulses on a digital output signal by starting and stopping the generation of the pulses at or about the transition points;
whereby the widths of the pulses corresponds to the widths of the bars making up the bar code symbol.

18. A digitizing method comprising:

providing an analog signal representative of the intensity of light reflected off a bar code symbol made up of alternating black and white bars having widths;

forming a first signal representative of a derivative of the analog signal from a circuit configured to have a bandwidth in the range of between about 500 Hz–100 KHz;

forming a second signal which is a complement of the first signal;

utilizing the first signal and the second signal to detect transition points of the analog signal, representative of transitions from black to white bars and vice-versa, such transition points being determined by the intersection of the first signal and the second signal; and generating digital pulses by starting and stopping the generation of pulses at or about the transition points, whereby the pulses have widths corresponding to the widths of the bars making up the bar code symbol.

19. A digitizing method comprising:

providing an analog signal representative of the intensity of light reflected off a bar code symbol made up of alternating black and white bars having widths;

forming a first signal representative of a derivative of the analog signal using at least one active filter, the active filter being configured in accordance with a parameter of interest for at least one scan of the symbol and capable of being reconfigured for at least one subsequent scan of the bar code symbol;

utilizing said first signal to detect transition points of the analog signal, representative of transitions from black to white bars and vice-versa; and generating digital pulses by starting and stopping the generation of pulses at or about the transition points, whereby the pulses have widths corresponding to the widths of the bars making up the bar code symbol.

20. A digitizing method comprising:

providing an analog signal representative of the intensity of light reflected off a bar code symbol, the bar code symbol being made up of alternating black and white bars having widths;

forming a first signal representative of a derivative of the analog signal;

generating a threshold signal for the scan which is independent of the analog signal, the threshold signal providing a threshold level capable of being switched from a first level to at least one different level for at least one subsequent scan of the bar code symbol;

detecting transition points of the analog signal, representative of transitions from white to black bars, and vice-versa, utilizing the first signal and the threshold signal;

generating digital pulses by starting and stopping the generation of digital pulses at or about the transition points;

whereby the widths of the pulses corresponds to the widths of the bars making up the bar code symbol.

21. The method of claim 20 wherein each threshold level generated is fixed in value.

22. The method of claim 20 including determining a threshold level which is appropriate for near field or small symbols.

23. The method of claim 20 including determining a threshold level which is appropriate for far field, large, or low contrast symbols.

24. The method of claim 20 including scanning the bar code symbol twice, once utilizing a threshold level determined appropriate for near field or small symbols, and once utilizing a threshold level determined appropriate for far field, large, or low contrast symbols.

25. A digitizing method comprising:

providing an analog signal representative of the intensity of light reflected off a bar code symbol during a scan, the bar code symbol being made up of alternating black and white bars having widths;

configuring at least one filter in accordance with a parameter of interest;

utilizing the at least one filter to form a first signal representative of a derivative of the analog signal;

detecting transition points of said analog signal, representative of transitions from white to black bars, and vice-versa, utilizing said first signal;

generating digital pulses by starting and stopping the generation of the pulses at or about the transition points; and varying the parameter of interest by switching the configuration of the at least one filter on at least one subsequent scan of the symbol;

whereby the widths of the pulses corresponds to the widths of the bars making up the bar code symbol.

26. The method of claim 25 wherein the parameter of interest is the overall bandpass, and including varying the overall bandpass of the filter from that of a previous scan.

27. The method of claim 25 wherein the parameter of interest is the overall amplification, and including varying the overall amplification of the filter from that of a previous scan.

28. The method of claim 25 wherein the parameter of interest is the overall bandpass, and including determining an overall bandpass for a scan which is appropriate for near field of small symbols.

29. The method of claim 25 wherein the parameter of interest is the overall bandpass, and including determining an overall bandpass for a scan which is appropriate for far field, large, or low contrast symbols.

30. The method of claim 25 wherein the parameter of interest is the overall amplification, and including determining an overall amplification for a scan which is appropriate for near field or small symbols.

31. The method of claim 25 wherein the parameter of interest is the overall amplification, and including determining an overall amplification for a scan which is appropriate for far field, large, or low contrast symbols.

32. The method of claim 25 wherein the parameter of interest is the overall bandpass, and including alternating, on successive scans, between scanning the symbol with the filter configured to have an overall bandpass determined appropriate for near field or small symbols, and scanning the symbol with the filter configured to have an overall bandpass determined appropriate for far field, large, or low contrast symbols.

33. The method of claim 25 wherein the parameter of interest is the overall amplification, and including alternating, on successive scans, between scanning the symbol with the filter configured to have an overall amplification determined appropriate for near field or small symbols, and scanning the symbol with the filter configured to have an overall amplification determined appropriate for far field, large, or low contrast symbols.

34. A signal processing method comprising:
- providing an analog signal representative of the intensity of light reflected off a bar code symbol made up of alternating black and white bars having widths;
- modulating a high frequency carrier signal by scanning it over the bar code symbol to form a first signal;
- high-pass filtering the first signal to remove low frequency noise and ambient light to form a second signal;
- low pass filtering the second signal to remove the high frequency carrier signal to form a third signal;
- forming a fourth signal representative of a derivative of the third signal;
- detecting transition points of the third signal, representing transitions from black to white bars and vice-versa, utilizing the fourth signal; and
- generating digital pulses by starting and stopping the generation of pulses at or about the transition points;
- whereby the widths of the pulses correspond to the widths of the bars making up the bar code symbol.

35. A signal processing method comprising:
- providing an analog signal representative of the intensity of light reflected off a bar code symbol made up of alternating black and white bars having widths;
- amplifying the analog signal in an amount determined by an AGC signal to form a first signal;
- detecting peaks of the first signal and modifying the AGC signal in response thereto whereupon the analog signal is thereafter amplified utilizing said AGC signal in an amount inversely proportional to the peaks of the first signal as detected;
- forming a second signal representative of a derivative of the second signal;
- utilizing said second signal to detect transition points of the analog signal representing transitions from black to white bars, and vice-versa; and
- generating, digital pulses at or about the transition points;
- whereby the widths of the pulses corresponds to the widths of the bars making up the bar code symbol.

36. The circuit of claim 3 wherein the threshold level is generated in response to a start of scan signal.

37. The circuit of claim 3 wherein the threshold generator is capable of forming and alternating between first and second threshold levels on successive scans of the symbol, wherein the first threshold level is determined appropriate for far field, large, or low contrast symbols, and wherein the second threshold level is determined appropriate for near field or small symbols.

38. The circuit of claim 3 wherein the threshold generator is capable of forming and switching between at least two threshold levels over at least one subsequent scan of the bar code symbol.

39. The circuit of claim 38 wherein at least one scan is made with a threshold level determined appropriate for far field, large, or low contrast symbols, and wherein at least one other scan is made with a threshold level determined appropriate for near field or small symbols.

40. The circuit of claim 8 wherein the at least one filter is an active filter.

41. The circuit of claim 8 wherein the parameter of interest is the overall bandpass.

42. The circuit of claim 41 wherein the first value of the parameter of interest is determined appropriate for near field or small symbols, and wherein a second value of the parameter of interest is determined appropriate for far field, large, or low contrast symbols.

43. The circuit of claim 41 wherein the first value of the parameter of interest is determined appropriate for far field, large, or low contrast symbols, and wherein a second value of the parameter of interest is determined appropriate for near field or small symbols.

44. The circuit of claim 8 wherein the parameter of interest is the overall amplification.

45. The circuit of claim 44 wherein the first value of the parameter of interest is determined appropriate for near field or small symbols, and wherein a second value of the parameter of interest is determined appropriate for far field, large, or low contrast symbols.

46. The circuit of claim 44 wherein the first value of the parameter of interest is determined appropriate for far field, large, or low contrast symbols, and wherein a second value of the parameter of interest is determined appropriate for near field or small symbols.

47. The method of claim 20 including generating the threshold level in response to a start of scan signal.

48. The method of claim 20 including alternating between one threshold level determined appropriate for far field, large, or low contrast symbols and another threshold level determined appropriate for near field or small symbols on successive scans of the bar code symbol.

49. The method of claim 20 including forming and switching between at least two threshold levels over at least one subsequent scan of the bar code symbol.

50. The method of claim 49 including scanning at least once with a threshold level determined appropriate for far field, large, or low contrast symbols, and scanning at least once with a threshold level determined appropriate for near field or small symbols.

51. The method of claim 25 wherein the at least one filter configured is an active filter.

52. The method of claim 26 including scanning at least once with an overall bandpass which is appropriate for near field or small symbols, and scanning at least once with an overall bandpass which is appropriate for far field, large, or low contrast symbols.

53. The method of claim 27 including scanning at least once with an overall bandpass which is appropriate for near field or small symbols, and scanning at least once with an overall bandpass which is appropriate for far field, large, or low contrast symbols.

* * * * *